United States Patent [19]
Saita et al.

[11] Patent Number: 6,035,958
[45] Date of Patent: Mar. 14, 2000

[54] POWER ASSIST APPARATUS FOR STEERING SYSTEM

[75] Inventors: Norihiro Saita, Isehara; Tatsuyoshi Maruyama, Atsugi; Toshinori Aihara, Hadano; Tadaharu Yokota, Samukawa, all of Japan

[73] Assignee: Unisia Jecs Corporation, Atsugi, Japan

[21] Appl. No.: 08/800,176

[22] Filed: Feb. 13, 1997

[30] Foreign Application Priority Data

| Feb. 13, 1996 | [JP] | Japan | 8-049571 |
| Feb. 16, 1996 | [JP] | Japan | 8-052658 |
| Feb. 16, 1996 | [JP] | Japan | 8-052659 |

[51] Int. Cl.$^7$ .................................................. B62D 5/08
[52] U.S. Cl. ........................ 180/441; 180/417; 60/468; 60/494
[58] Field of Search .................... 180/417, 441, 180/442, 421; 91/375 R; 60/468, 494

[56] References Cited

U.S. PATENT DOCUMENTS

| 4,860,635 | 8/1989 | Uchida et al. | 180/442 |
| 4,884,648 | 12/1989 | Uchida et al. | 180/442 |
| 5,092,418 | 3/1992 | Suzuki et al. | 180/441 |
| 5,133,424 | 7/1992 | Fox et al. | 180/441 |
| 5,515,938 | 5/1996 | Haga et al. | 180/442 |
| 5,538,095 | 7/1996 | Haga et al. | 180/441 |
| 5,638,912 | 6/1997 | Haga et al. | 180/441 |
| 5,845,737 | 12/1998 | Suzuki et al. | 180/417 |

FOREIGN PATENT DOCUMENTS

| 0 594 137 A2 | 4/1994 | European Pat. Off. . |
| 6-127398 | 5/1994 | Japan . |

*Primary Examiner*—Daniel G. DePumpo
*Attorney, Agent, or Firm*—Foley & Lardner

[57] ABSTRACT

A steering power assist apparatus is comprised of a power cylinder whose operation is controlled by the a flow rate control valve, a first control valve and a second control valve. The flow rate control valve is connected to a discharge side of a hydraulic pump and controls the amount of the hydraulic oil to be supplied to the first and second control valves according to a load pressure. The first control valve constituted by choke valves is disposed downstream of the flow rate control valve and controls the amount of the hydraulic oil supplied to the second control valve according to a steering torque. The second control valve constituted by choke valves is disposed downstream of the flow rate control valve and controls the amount of the hydraulic oil to the power cylinder according to a steering torque. The choke valves of the second control valve are fully closed after the choke valves of the first control valve are fully closed.

10 Claims, 20 Drawing Sheets

POWER ASSIST APPARATUS FOR STEERING SYSTEM

BACKGROUND OF THE INVENTION

The present invention relates to improvements in a power assist apparatus of a steering system for an automotive vehicle, and more particularly to a steering power assist apparatus which generates a steer assisting power by supplying hydraulic oil to and discharging it from an actuator of a steering mechanism.

A variety of power assist apparatuses for a steering system have been proposed and put in practical use to improve the steering feeling for a drive and the energy consumption of a hydraulic pump. A Japanese Patent Provisional Publication No. 6-127398 discloses a power steering apparatus which includes a flow rate control valve for increasing a flow rate of hydraulic oil according to the increase of a load pressure, a first control valve of a bridge circuit which is constituted by four choke valves of semi center open type, a second control valve of a bridge circuit which is constituted by two center-close type choke valves disposed in an upstream side and two center-open type choke valves disposed in a downstream side. This conventional power steering apparatus is arranged such that each choke valve of the first control valve starts closing at the generally same time that the upstream-side choke valves start closing.

However, this conventional power steering apparatus requires to increase a base flow rate to be supplied to the control valves during a neutral condition so that this apparatus can smoothly execute steering operation in a situation that a steering operation is radically operated from the neutral condition.

SUMMARY OF THE INVENTION

It is an object of the present invention to provide an improved power assist apparatus which functions to decrease the workload of a hydraulic pump during a neutral position of a steering and to generate a stable assist power without causing the shortage of the hydraulic flow-rate even when a steering operation is radically executed.

A first aspect of the present invention resides in a power assist apparatus for applying assist power to a steering system. The power assist apparatus comprises a hydraulic pump supplying hydraulic oil and a flow rate control valve which is connected to a discharge side of the hydraulic pump and controls the flow rate of the hydraulic oil according to a load pressure of the hydraulic pump. A power cylinder, through which assist power is applied to the steering system, has first and second hydraulic chambers. A first control valve is disposed downstream of the flow rate control valve and includes choke valves of a center open type which are constructed into a bridge circuit. Each choke valve changes its choke amount according to the steering torque of a steering shaft of the steering system. A second control valve includes at least two choke valves which change their choke amounts according to the steering torque of the steering shaft. One of choke valves of the second control valve is connected to the first hydraulic chamber and the other one of the choke valves of said second control valve is connected to the second hydraulic chamber to control the flow rate of the hydraulic oil supplied to the first and second hydraulic chambers. The first control valve controls the flow rate of the hydraulic oil to be supplied to the power cylinder and the second control valve. The choke valves of said second control valve finish their operations after at least one of the choke valves of the first control valve finishes its operation.

A second aspect of the present invention resides in a power assist apparatus for applying assist power to a steering system. The power assist apparatus comprises a hydraulic pump discharging hydraulic oil and a hydraulic pressure passage connected with a discharging side of the hydraulic pump. A flow rate control valve is disposed in the hydraulic pressure passage and controls the flow rate of the hydraulic oil flowing through the hydraulic pressure passage according to the hydraulic pressure of the hydraulic pump. First and second branch passages branched from the hydraulic pressure passage. A flow resistance means is disposed in the second branch passage. A power cylinder, through which assist power is applied to a steering system, has first and second hydraulic chambers. A first control valve is disposed downstream of the first branch passage and includes first, second, third and fourth choke valves which change their choke amounts according to the steering torque of a steering shaft of the steering system. The first and second choke valves is arranged in parallel and connected to said first branch passage. The third choke valve is disposed downstream of the first choke valve. The fourth valve is disposed downstream of the second choke valve. A second control valve is disposed downstream of the second branch passage and includes first, second, third and fourth choke valves which change their choke amounts according to the steering torque of the steering shaft. The first and second choke valves are arranged in parallel and connected to the second branch passage. The third choke valve is disposed downstream of the first choke valve, the fourth valve being disposed downstream of the second choke valve. A first point connecting the first and second choke valve is connected to the first hydraulic chamber of the power cylinder and a second point connecting the first and second choke valve is connected to the first hydraulic chamber of the power cylinder. The first and second choke valves of the second control valve are fully closed after at least one of the choke valves of the first control valve is fully closed.

A third aspect of the present invention resides in a power assist apparatus for applying applies assist power to a steering system. The power assist apparatus comprises a hydraulic pump discharging hydraulic oil and hydraulic pressure passage connected with a discharging side of the hydraulic pump. A flow rate control valve is disposed in the hydraulic pressure passage and controls the flow rate of the hydraulic oil flowing through the hydraulic pressure passage according to the hydraulic pressure of the hydraulic pump. First and second branch passages are branched from the hydraulic pressure passage. A first control valve includes first, second, third and fourth choke valves which change their choke amounts according to the steering torque of a steering shaft of the steering system. The first and second choke valves is serially disposed in the first branch passage. The third and fourth choke valves is serially disposed in the second branch passage. A connecting passage connects the first branch passage between the first and second choke valves of the first control valve and the second branch passage between the third and fourth choke valves of the first control valve. A flow resistance means is disposed in the connecting passage. A power cylinder, through which assist power is applied to a steering system, has first hydraulic chamber connected to the first branch passage downstream of the second choke valve of the first control valve and a second hydraulic chamber connected to the second branch passage downstream of the fourth choke valve of the first control valve. A first drain passage is connected to the first hydraulic chamber of the power cylinder, and a second drain passage is connected to the second hydraulic chamber of said power cylinder. A second control valve includes first and second choke valves which change their choke amounts according to the steering torque of the steering shaft. The first choke valve is disposed in the first drain passage and the second choke valve is disposed in the second discharging passage. The first and second choke valves of the second control valve is fully closed after at least one of the choke valves of the first control valve is fully closed.

DETAILED DESCRIPTION OF THE INVENTION

Referring to FIGS. 1 to 7, there is shown a first embodiment of a power assist apparatus according to the present invention.

Figure 1:
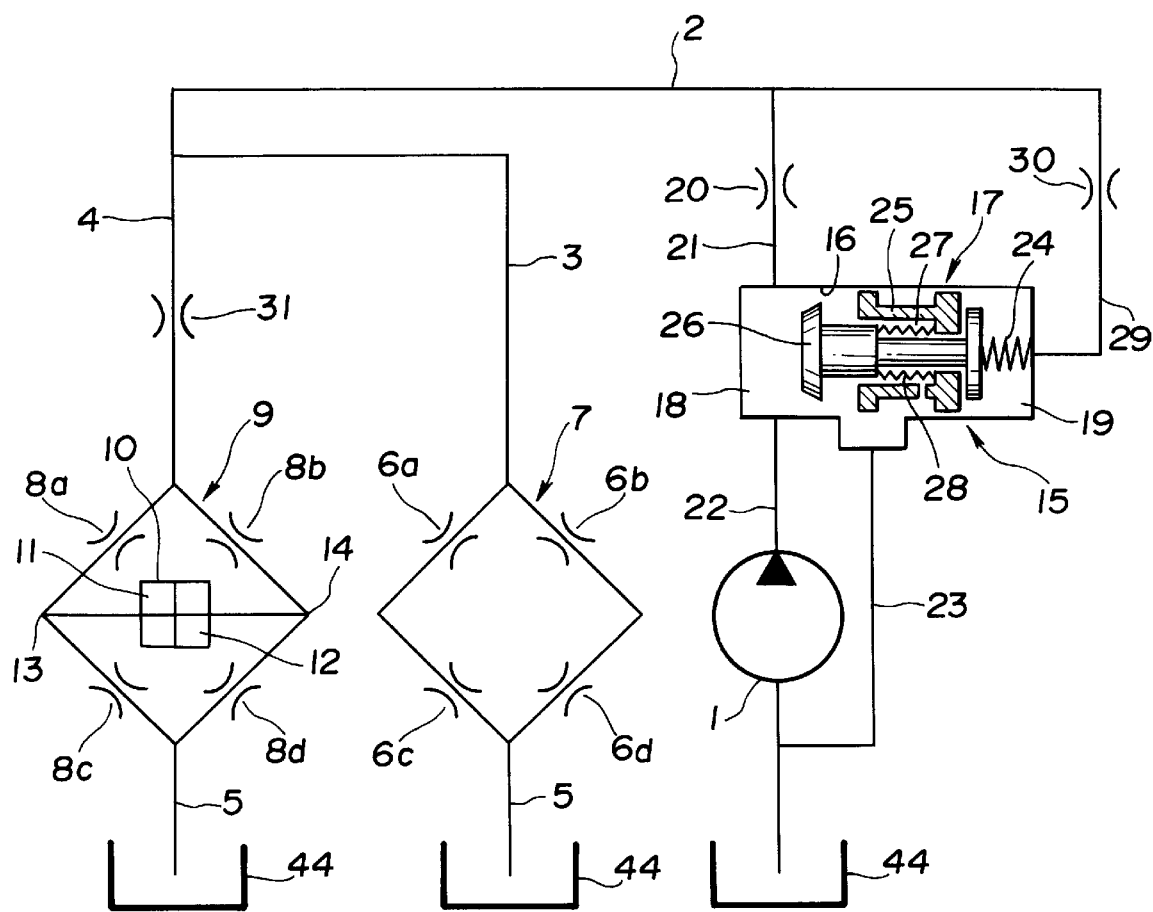
FIG. 1 is an explanatory view which shows a first embodiment of a steering power assist apparatus according to the present invention.

As shown in FIG. 1, a hydraulic pump 1 driven by an internal combustion engine (not shown) supplies hydraulic oil to a hydraulic pressure passage 2. The hydraulic pressure passage 2 is branched into a first branch passage 3 and a second branch passage 4. Disposed between the first branch passage 3 and a drain passage 5 is a first control valve 7 which includes four choke valves 6a, 6b, 6c and 6d arranged into a four-side bridge circuit. Each choke valve 6a, 6b, 6c, 6d is of a center open type and changes its choke amount according to a steering torque of a not-shown steering shaft. Disposed between the second branch passage 4 and the drain passage 5 is a second control valve 9 which includes four choke valves 8a, 8b, 8c and 8d arranged into a four-side bridge circuit. Each choke valve 8a, 8b, 8c, 8d is of a center open type and changes its choke amount according to a steering torque of the steering shaft.

A power cylinder 10 connected to a steer linkage (not shown) has a pair of hydraulic chambers 11 and 12 which are respectively connected to a node 13 between the choke valves 8a and 8c and a node 14 between the choke valves 8b and 8d so that the hydraulic oil is supplied to the hydraulic chambers 11 and 12 through the choke valves 8a, 8b, 8c and 8d. A flow rate control valve 15 disposed in the hydraulic pressure passage 2 is arranged to change the flow rate of the hydraulic oil to be supplied to the first control valve 7 and the second control valve 9 according to the change of load pressure. The flow rate control valve 15 is arranged such that a spool valve 17 is slidably disposed in a spool cylinder 16 and divides the spool cylinder 16 into a first pressure chamber 18 and a second pressure chamber 19. The first pressure chamber 18 is communicated with a drain passage 23, an inlet passage 22 connected to a discharge port of the hydraulic pump 1, and a discharging passage 21 connected to the hydraulic pressure passage 2 through a control orifice 20. The second pressure chamber 19 is communicated with a guide passage 29 which connected to hydraulic pressure passage 2 through a pressure sensitive orifice 30. A control spring 24 disposed in the second pressure chamber 19 biases the spool valve 17 toward the first pressure chamber 18 so that the necessary flow rate of the hydraulic oil is supplied from the inlet passage 22 through the control orifice 20 to the hydraulic pressure passage 2 and the residual of the hydraulic oil is returned to the drain passage 23 which is opened and closed by moving the spool valve 17.

The spool valve 17 is constituted by an outer spool 25 which is formed in a cylinder having a holed bottom and an inner spool 26 which has a large portion inserted in the cylinder of the outer spool 25 and a small portion inserted into a bottom hole of the outer spool 25. The bottom portion of the outer spool 25 is disposed in the second pressure chamber 19. A low pressure chamber 27 is defined by an inner periphery of the cylinder of the outer spool 25, an outer periphery of the small portion of the inner spool 25, an end portion of the large portion of the outer spool 25 and an inner surface of the bottom of the outer spool 25. A spring 28 is disposed between the inner spool 26 and the outer spool 25 so as to bias the inner spool 26 toward the first pressure chamber 18 and the outer spool 25 toward the second pressure chamber 19. An orifice 31 functioning as a flow resistance is disposed in the second branch passage 4.

Figure 2:
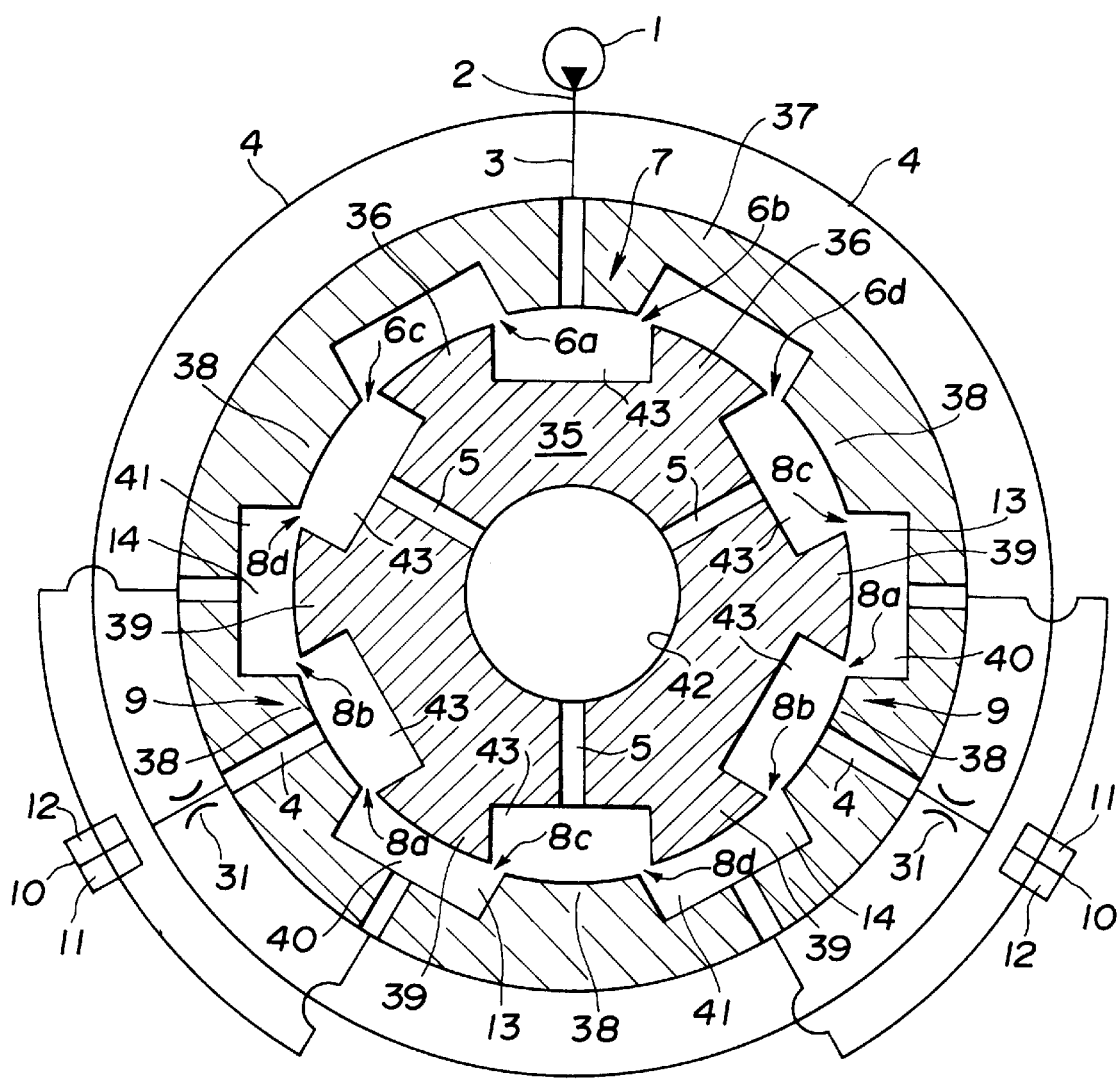
FIG. 2 is a view which shows a structure of first and second control valves.
Figure 3:
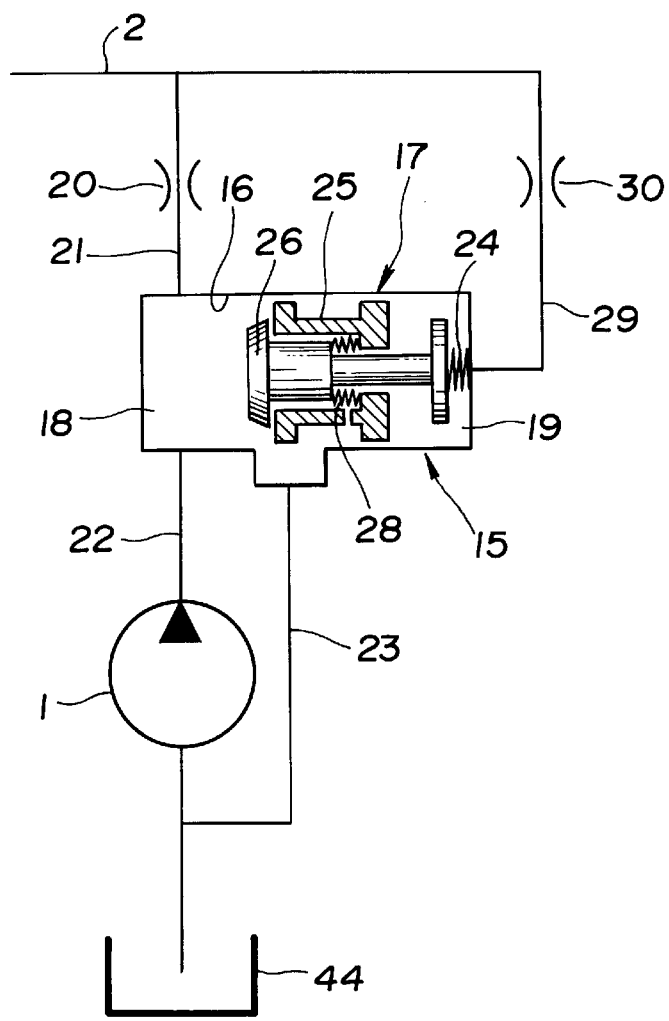
FIG. 3 is a partial view of the power assist apparatus of FIG. 1 which shows an operating condition of a flow rate control valve in a high load pressure.
Figure 4:
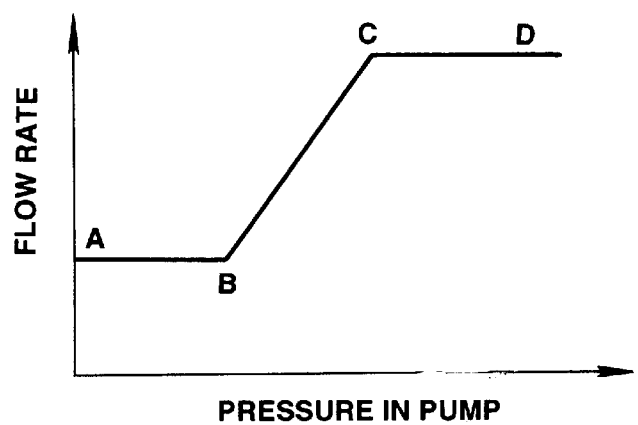
FIG. 4 is a graph which shows a characteristic curve of the flow rate control valve.

As shown in FIG. 2, the choke valves 6a, 6b, 6c and 6d of the first control valve 7 are constituted by two inner projections 36 and 36 and three outer projections 38, 38 and 38. The two inner projections 36 and 36 are formed at an outer periphery of a valve shaft 35 which is integrally rotatable with the steering shaft (not shown). The three outer projections 38, 38 and 38 are formed at an inner periphery of a circular valve body 37 which is rotatably interconnected with the valve shaft 35 through a torsion bar (not shown) and interconnected to a wheel side. That is, the choke valves 6a, 6b, 6c and 6d are constituted by circumferential end portions of the inner projections 36 and circumferential end portions of the outer projections 38. Similarly, the choke valves 8a, 8b, 8c and 8d of the second control valve 9 are constituted by four inner projections 39, 39, 39 and 39 formed at an outer periphery of the valve shaft 35 and five outer projections 38, 38, 38, 38 and 38 formed at an inner periphery of the valve body 37. That is, the choke valves 8a, 8b, 8c and 8d are constituted by circumferential end portions of the inner projections 39 and circumferential end portions of the outer projections 38. The circumferential dimension of each inner projection 36 is formed greater than that of each inner projection 39 on the valve shaft 35.

Figure 6:
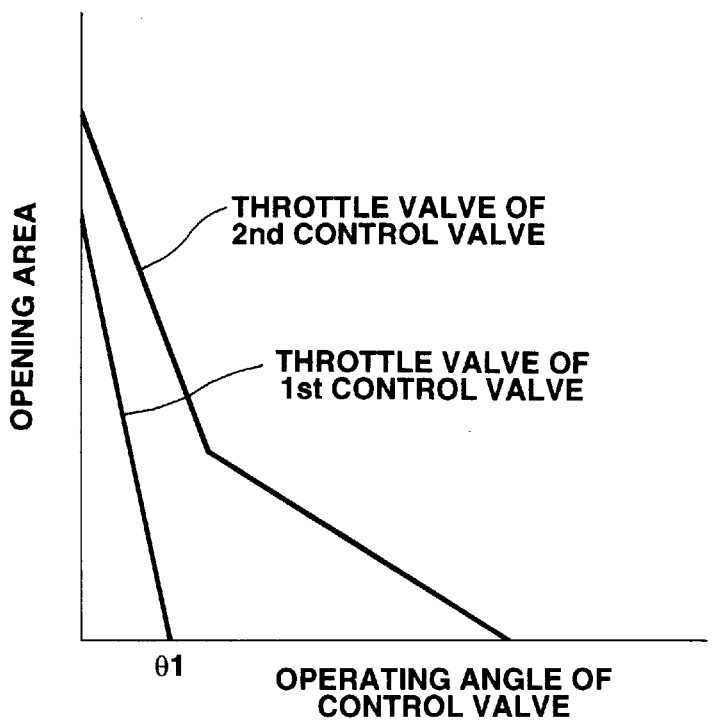
FIG. 6 is a graph which shows relationships between an operated angle and an opening area of the control valves.

Therefore, when the valve shaft 35 is rotated with respect to the valve body 37, the choke valves 6a and 6d, or 6b and 6c of the first control valve 7 are fully closed before the choke valves 8a and 8d, or 8b and 8c of the second control valve 9 are fully closed, as shown in FIG. 6. Depressions 40 and 40 of the valve body 37 formed respectively between the choke valves 8a and 8c are the node 13 which connects the choke valves 8a and 8c with the hydraulic chamber 11 of the power cylinder 10. Depressions 41 of the valve body 37 formed between the choke valves 8b and 8d are the node 14 connecting the choke valves 8b and 8d. The node 14 is further communicated with the hydraulic chamber 12 of the power cylinder 10. A central passage 42 of the valve shaft 35 is communicated with three depressions 43, 43 and 43 through three drain passages 5, 5 and 5, as shown in FIG. 2 and is communicated with an oil tank 44. Although the two power cylinders 10 and 10 are shown in FIG. 2, these power cylinders 10 and 10 indicate the same one. FIG. 2 shows a condition that a steering wheel is put in a neutral state and the first and second control valves 7 and 9 are put in a neutral state.

Next, the manner of operation of the power assist apparatus of the first embodiment according to the present invention will be discussed.

The hydraulic pump 1 is rotated by a not-shown internal combustion engine. The hydraulic oil discharged from the hydraulic pump 1 is supplied to the first pressure chamber 18 of the flow rate control valve 15 through the guide passage 22. The hydraulic oil supplied to the first pressure chamber 18 is returned to the inlet side of the hydraulic pump 1 and the oil tank 44 only when the control orifice 20 limits the flow of the hydraulic oil and the drain passage 23 is opened by the movement of the spool valve 17 by the pressure differences between the inlet side and the outlet side of the control orifice 20. That is, a necessary flow rate of the hydraulic oil under the limitation of the control orifice 20 is supplied from the discharging passage 21 to the hydraulic pressure passage 2 and the first and second branch passages 3 and 4.

The flow rate control valve 15 is arranged such that the spool valve 17 is constituted by the outer spool 25 and the inner spool 26, the spring 28 biases the inner spool 26 toward the first pressure chamber 18 and the outer spool 25 toward the second pressure chamber 19, and the control spring 24 biases the inner spool 26 toward the first pressure chamber 18. Therefore, when the pressure in the first and second pressure chambers 18 and 19 is low, the outer spool 25 is biased toward the second pressure chamber 18 by the spring 28, and the spool valve 17 compresses the control spring 24 at a predetermined length to control the flow rate by means of the pressure difference by the control orifice 20 and the spring force of the control spring 24. When the pressure in the first and second pressure chambers 18 and 19 is high, the outer spool 25 is moved toward the first pressure chamber 18 by the pressure in the second pressure chamber 18, 19 against the biasing force of the spring 28 so as to be located at a predetermined position. By this movement of the outer spool 25, the positional relationship between the spool valve 17 and the drain passage 23 is changed. Therefore, the spool valve 17 further compresses the control spring 28. The spool valve 17 is moved while keeping the balance between the sum of the biasing force of the control spring 24 and the biasing force of the spring 28 and the pressure in the first and second pressure chambers 18 and 19 to control the flow rate.

That is, when the pressure in the first pressure chamber 18 is low (when the inner pressure of the hydraulic pump 1 is low), the outer spool 25 is biased toward the second pressure chamber 19 by the spring 28 and integrally functions with the inner spool 26. Therefore, the spool valve 17 is moved according to the biasing force of the control spring 24 and the pressure difference by the control orifice 20, and the flow rate passing through the control orifice 20 is represented by a line segment A–B in FIG. 4.

Next, if the pressure in the first pressure chamber 18 is raised up, the flow rate passing through the control orifice 20 is also increased and the pressure in the hydraulic pressure passage 2 is increased. Therefore, the pressure in the second pressure chamber 19 is increased since the pressure in the hydraulic pressure passage 2 is supplied to the second pressure chamber 19. When the pressure in the second pressure chamber 19 is increased to overcome the biasing force of the spring 28, the outer spool 25 is moved toward the first pressure chamber 18 until the biasing force of the spring 28 is balanced with the pressure in the second pressure chamber 19 so as to decrease the opening area of the drain passage 23. The decrease of the opening area of the drain passage 23 invites the increase of the pressure difference of the control orifice 20 and therefore the spool valve 17 is moved toward the second pressure chamber 19 against the biasing force of the control spring to keep the pressure difference by the control orifice 20 constant. Therefore, the flow rate control valve 15 executes the flow rate control by locating the spool valve 17 at a position where the pressure difference of the control orifice 20 is balanced with the sum of the biasing force of the spring 28 and the biasing force of the control spring 24. Accordingly, the flow rate passing through the control orifice 20 becomes as shown by the line segment B–C of FIG. 4.

When the pressure in the first and second pressure chambers 18 and 19 reaches a predetermined pressure, the outer spool 25 is moved to the most biased position toward the first pressure chamber 18 upon the spring 28 is put in the most biased condition. In this condition, the spool valve 17 controls the flow rate in response to the control spring 24 and the pressure difference by the control orifice 20, such that the flow rate passing through the control orifice 20 is controlled as shown by the line C–D of FIG. 4. When The flow rate is the maximum value supplied to the hydraulic pressure passage 2 and the load pressure is high, that is, when the first and second control valves 7 and 9 are put in the operating condition, the flow rate passing through the control orifice 20 is normally controlled at the flow rate shown by the line C–D of FIG. 4.

On the other hand, when the steering is put in the neutral position, that is, when the first and second control valves 7 and 9 are put in the neutral position, the hydraulic oil supplied to the first and second control valves 7 and 9 is returned through the center-open type choke valves 6a, 6b, 6c and 6d of the first control valve 7 to the drain passage 5. This lowers the operation pressure of the hydraulic pressure passage 2 and lowers the pressure in the second pressure chamber 19. Since the choke valves 8a, 8b, 8c and 8d of the second control valve 9 are also of a center-open type, the hydraulic oil is also returned to the drain passage 5 through the second control valve 9 though receiving the flow resistance of the orifice 31. Therefore, in order to keep the difference pressure by the control orifice 20 constant, the spool valve 17 is moved toward the second pressure chamber 19 against the biasing force of the control spring 24 to increase the opening area of the drain passage 23. Accordingly, most of the hydraulic oil supplied to the first pressure chamber 18 through the guide passage 22 is flowed into the drain passage 23 to decease the inner pressure (discharging pressure) of the hydraulic pump 1. This decreases the workload of the hydraulic pump 1. Simultaneously, non-operating condition of the first and second control valves 7 and 9 lowers the pressure in the hydraulic pressure passage 2 and the pressure in the second pressure chamber 19. Therefore, the outer spool 25 receiving the pressure of the second pressure chamber 19 is moved toward the second pressure chamber 19 by the biasing force of the spring 28. Therefore, in case that the spool valve 17 constituted by the inner and outer spools 25 and 26 is located at a position where the pressure difference by the control orifice 20, more particularly, the pressure in the first pressure chamber 18 and the sum of the pressure in the second pressure chamber 19 and the biasing force of the control spring 24 are balanced, the opening area of the drain passage 23 is further increased by the movement amount of the outer spool 25 toward the second pressure chamber 19.

In the non-operating condition, the hydraulic oil supplied to the first pressure chamber 18 is returned to the inlet side of the hydraulic pump 1 and the oil tank 44 through the drain passage 23 whose opening area has been increased. Therefore, the hydraulic pump 1 discharging the hydraulic oil through the guide passage 22 to the first pressure chamber 18 decreases its discharging pressure, that is, the workload of the hydraulic pump 1 is decreased. This effectively improves the energy saving.

Next, when the steering operation of the steering wheel is started from the neutral position, the relative rotation through the torsion bar is generated between the valve shaft 35 and the valve body 37. The valve shaft 35 is integrally movable with the steering shaft receiving the steering force from the steering wheel and the valve body 37 receives the contact resistance of the steered wheels under the large contact resistance condition. In this condition, the choke valves 6a and 6d, or 6b and 6c of the first control valve 7 are fully closed, then the choke valves 8a and 8d, or 8b and 8c of the second control valve 9 are fully closed. That is, the first control valve 7 is operated before the second control valve 9 is operated. Therefore, by closing the first control valve 7, the hydraulic oil returned from the first branch passage 3 through the first control valve 7 to the drain passage 5 is flowed by the orifice 31 in the second branch passage 4 from the second branch passage 4 through the orifice 31 to the second control valve 9 when the steering is put in the neutral position.

Figure 7:
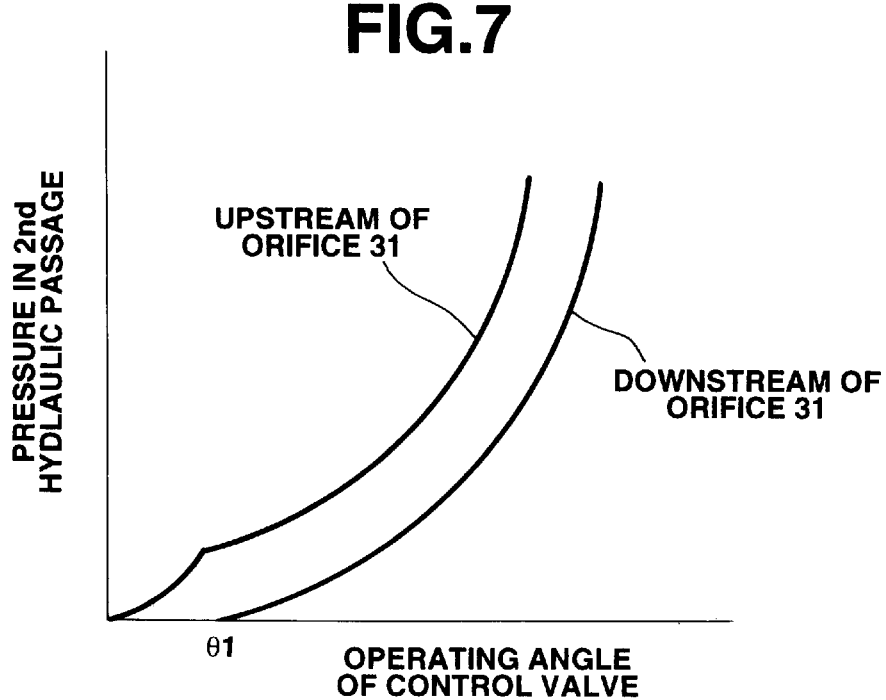
FIG. 7 is a graph which shows a relationship between the operated angle of the control valve and the pressure difference by an orifice set in a second branch passage.

By the flow of the hydraulic oil through the orifice 31 functioning as a flow resistance, the orifice 31 generates the pressure difference between the upstream side and the downstream side thereof, and the pressure at the upstream side of the orifice 31 is increased as shown in FIG. 7. Accordingly, the control valve 15 for controlling the flow rate according to the load pressure promptly increases the flow rate of the hydraulic oil supplied to the hydraulic pressure passage 2 and the second control valve 9.

Figure 5:
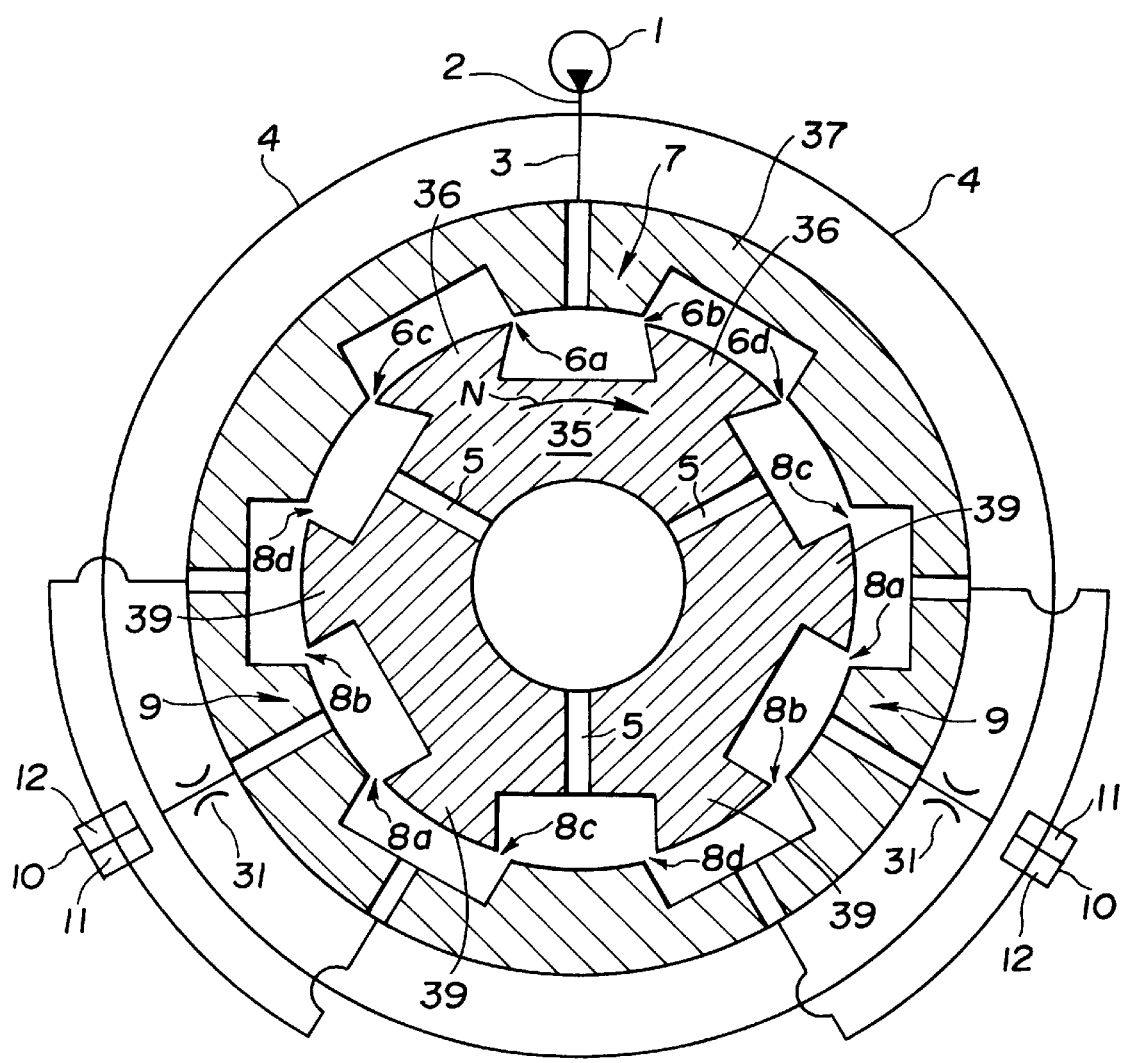
FIG. 5 is a view which shows a transition of the first and second control valves from a neutral condition to the operating condition.

When the valve shaft 35 is rotated with respect to the valve body 37 in the clockwise direction shown by the arrow N in FIG. 5 from the neutral position shown in FIG. 2, the choke valves 6a and 6d of the first control valve 7 is first closed and simultaneously the choke valves 6b and 6c are opened, and therefore the flow through the first branch passage 3 to the drain passage 5 is closed. Then, the choke valves 8a and 8d of the second control valve 9 are closed, and the choke valves 8b and 8c are further opened. Accordingly, the hydraulic oil supplied through the orifice 31 is supplied to the hydraulic chamber 11 of the power cylinder 10 through the choke valve 8b, and the hydraulic oil in the hydraulic chamber 11 of the power cylinder 10 is discharged through the choke valve 8c to the drain passage 5. As a result, the power cylinder 10 is moved toward the predetermined direction to apply the steering assist power directing in the predetermined direction to the steering linkage.

On the other hand, when the steering wheel is steered in a direction reverse to the above condition such that the valve shaft 35 is rotated with respect to the valve body 37 in the anticlockwise direction, the choke valves 6b and 6c of the first control valve 7 are first closed and simultaneously the choke valves 6a and 6d are opened, and therefore the flow through the first branch passage 3 to the drain passage 5 is closed. Then, the choke valves 8b and 8c of the second control valve 9 are closed, and the choke valves 8a and 8d are further opened. Accordingly, the hydraulic oil supplied through the orifice 31 is supplied to the hydraulic chamber 11 of the power cylinder 10 through the choke valve 8a, and the hydraulic oil in the hydraulic chamber 12 of the power cylinder 10 is discharged through the choke valve 8d to the drain passage 5. As a result, the power cylinder 10 is moved toward the predetermined direction to apply the steering assist power directing in the predetermined direction to the steering linkage.

Therefore, even when the radical steering operation is executed, the flow rate control valve 15 promptly increases the flow rate of the hydraulic oil. Since the increased amount of the hydraulic oil is flowed into the hydraulic chamber 11 or 12 of the power cylinder 10 through the choke valve 8a or 8b, the steering assist power is stably applied to the steering linkage without causing the shortage of the flow rate of the hydraulic oil.

Figure 8:
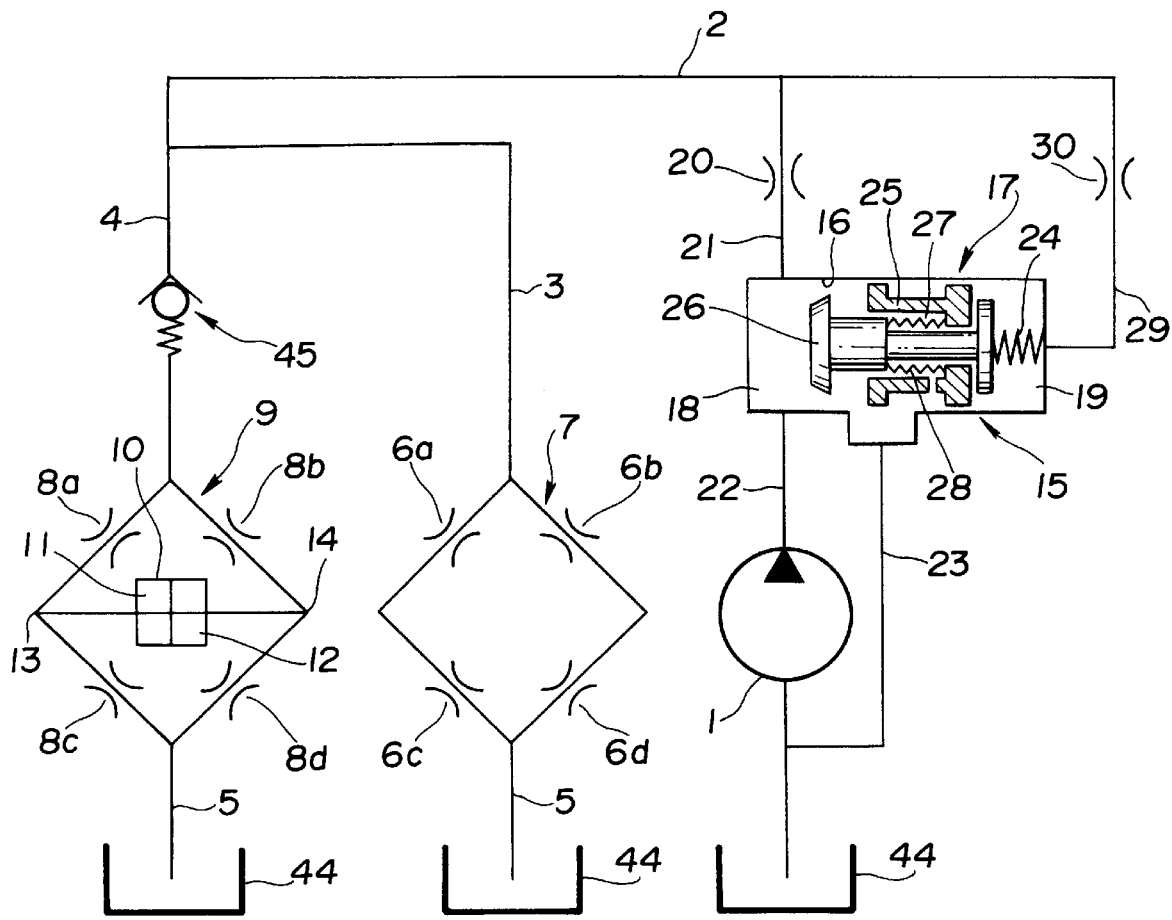
FIG. 8 is an explanatory view which shows a second embodiment of a power assist apparatus according to the present invention.
Figure 9:
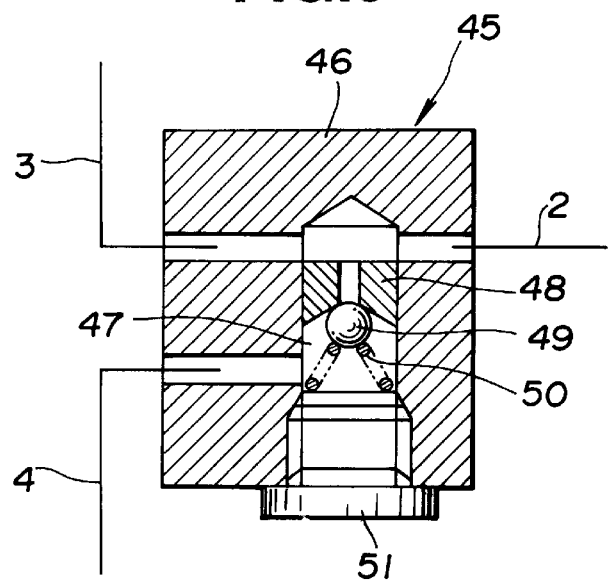
FIG. 9 is an explanatory view which shows a structure of a check valve applied to the second embodiment of FIG. 8.

Referring to FIGS. 8 and 9, there is shown a second embodiment of the power assist apparatus according to the present invention. This second embodiment is generally the same as the first embodiment except that a check valve 45 instead of the orifice 31 is disposed in the second branch passage 4. The check valve 45 functions to allow the hydraulic oil flow from the hydraulic pump 1 to the second control valve 9 and to forbid the flowing from the second control valve 9 to the hydraulic pump 1.

As shown in FIG. 9, a valve housing 46 of the check valve 45 has a valve hole 47 to which the hydraulic pressure passage 2 and the first and second branch passages 3 and 4 are respectively communicated. A hollow plug 48 is installed in the valve hole 47 such that a ball valve 49 is biasingly disposed on a valve seat of the hollow plug 48 by means of a check spring 50. In order to set the pressure difference between the upstream and downstream of the check valve 45 at a predetermined value, a preferable spring is selected as the check spring 50. An open end of the valve hole 47 is fixedly and sealingly closed by a plug 51 functioning as a check spring pushing means. Since the other structure of the second embodiment is generally the same as that of the first embodiment, the same parts as the first embodiment are designated by the same reference numerals, and the explanation thereof will be omitted herein.

With this arrangement of the second embodiment, in addition to ensuring the same functions and advantages as is similar to that of the first embodiment by the operation of the check valve 45 which functions as a flow resistance means, the check valve 45 functions as a pressure control means to suppress the increase of the pressure of the hydraulic oil in the hydraulic pressure passage 2. That is, it becomes possible to keep the pressure difference between the upstream and downstream of the check valve 45 at a predetermined value by means of the biasing force of the check spring 50. Therefore, even if the flow rate passing through the check valve 45 is increased, the pressure difference by the check valve 45 is kept within the predetermined value. This is effective to prevent the temperature rising of and the degradation of the hydraulic oil.

Referring to FIGS. 10 to 17, there is shown a third embodiment of the power assist apparatus according to the present invention.

Figure 10:
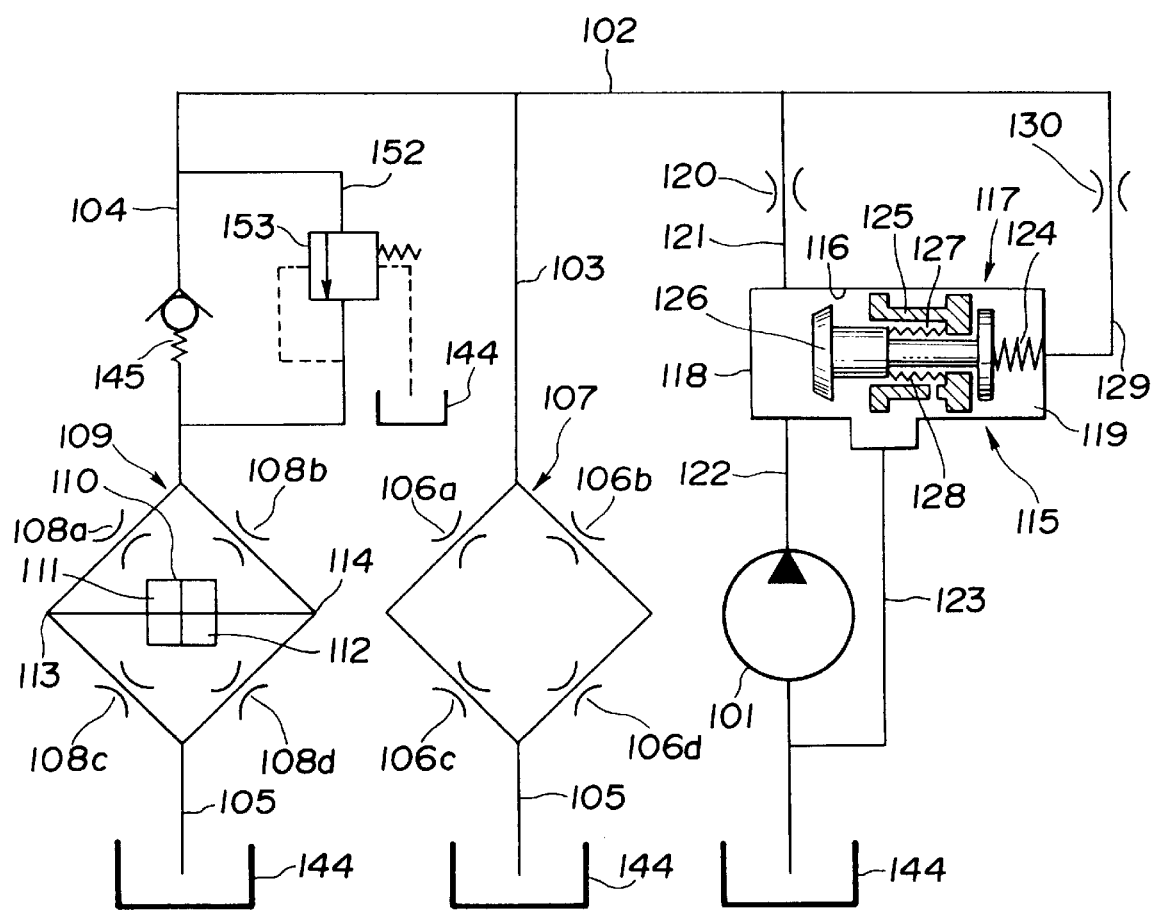
FIG. 10 is an explanatory view which shows a third embodiment of a power assist apparatus according to the present invention.

As shown in FIG. 10, a hydraulic pump 101 driven by an internal combustion engine (not shown) supplies hydraulic oil to a hydraulic pressure passage 102. The hydraulic pressure passage 102 is branched into a first branch passage 103 and a second branch passage 104. Disposed between the first branch passage 103 and a drain passage is a first control valve 107 which includes four choke valves 106a, 106b, 106c and 106d arranged into a four-side bridge circuit. Each choke valve 106a, 106b, 106c, 106d is of a center open type and changes its choke amount according to a steering torque of a not-shown steering shaft. Disposed between the second branch passage 104 and the drain passage 105 is a second control valve 109 which includes four choke valves 108a, 108b, 108c and 108d arranged into a four-side bridge circuit. Each choke valve 108a, 108b, 108c, 108d is of a center open type and changes its choke amount according to a steering torque of the steering shaft.

A power cylinder 110 connected to a steer linkage (not shown) has a pair of hydraulic chambers 111 and 112 which are respectively connected to a node 113 between the choke valves 108a and 108c and a node 114 between the choke valve 108b and 108d so that the hydraulic oil is supplied to the hydraulic chambers 111 and 112 through the choke valves 108a, 108b, 108c and 108d. A flow rate control valve 115 disposed in the hydraulic pressure passage 102 is arranged to change the flow rate of the hydraulic oil to be supplied to the first control valve 107 and the second control valve 109 according to the change of load pressure. The flow rate control valve 115 is arranged such that a spool valve 117 is slidably disposed in a spool cylinder 116 and divides the spool cylinder 116 into a first pressure chamber 118 and a second pressure chamber 119. The first pressure chamber 118 is communicated with a discharging passage 121 connected to the hydraulic pressure passage 102 through a control orifice 120, an inlet passage 122 connected to a discharge port of the hydraulic pump 101 and a drain passage 123. The second pressure chamber 119 is communicated with a guide passage 129 which connected to hydraulic pressure passage 102 through a pressure sensitive orifice 130. A control spring 124 disposed in the second pressure chamber 119 biases the spool valve 17 toward the fist pressure chamber 118 so that the necessary flow rate of the hydraulic oil is supplied from the guide passage 122 through the control orifice 120 to the hydraulic pressure passage 102 and the residual of the hydraulic oil is returned to the drain passage 123 which is opened and closed by moving the spool valve 117.

The spool valve 117 is constituted by an outer spool 125 which is formed in a cylinder having a holed bottom and an inner spool 126 which has a large portion inserted in a cylinder of the outer spool 125 and a small portion inserted into a bottom hole of the outer spool 125. The bottom portion of the outer spool 125 is disposed in the second pressure chamber 119. A low pressure chamber 127 is defined by an inner periphery of the cylinder of the outer spool 125, an outer periphery of the small portion of the inner spool 125, an end portion of the large portion of the outer spool 125 and an inner surface of the bottom of the outer spool 125. A spring 128 is disposed between the inner spool 126 and the outer spool 125 to bias the inner spool 126 toward the first pressure chamber 118 and the outer spool 125 toward the second pressure chamber 119. A check value 145 functioning as flow resistance is disposed in the second branch passage 104.

Figure 11:
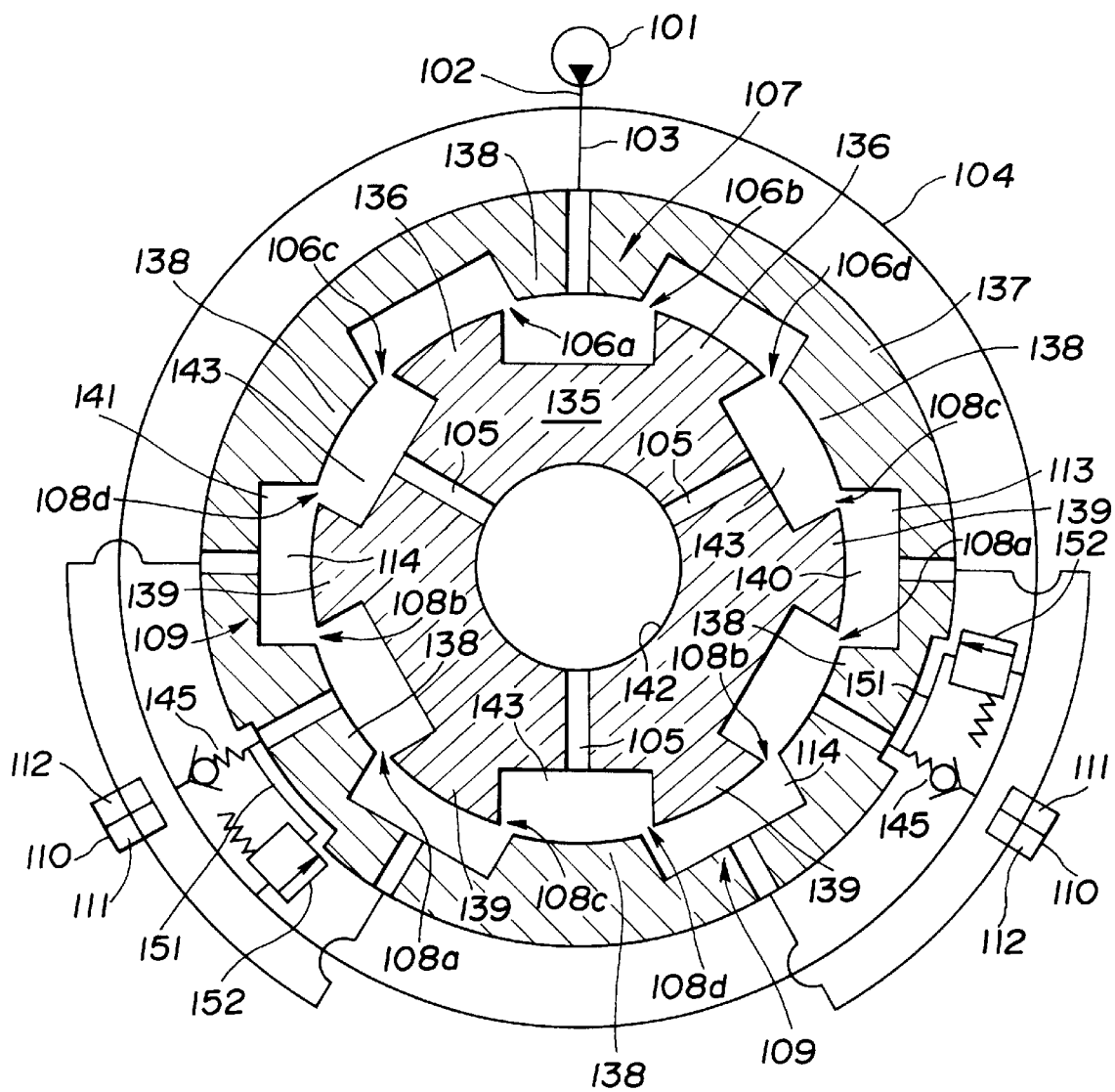
FIG. 11 is a view which shows a structure of first and second control valves of FIG. 10.
Figure 16:
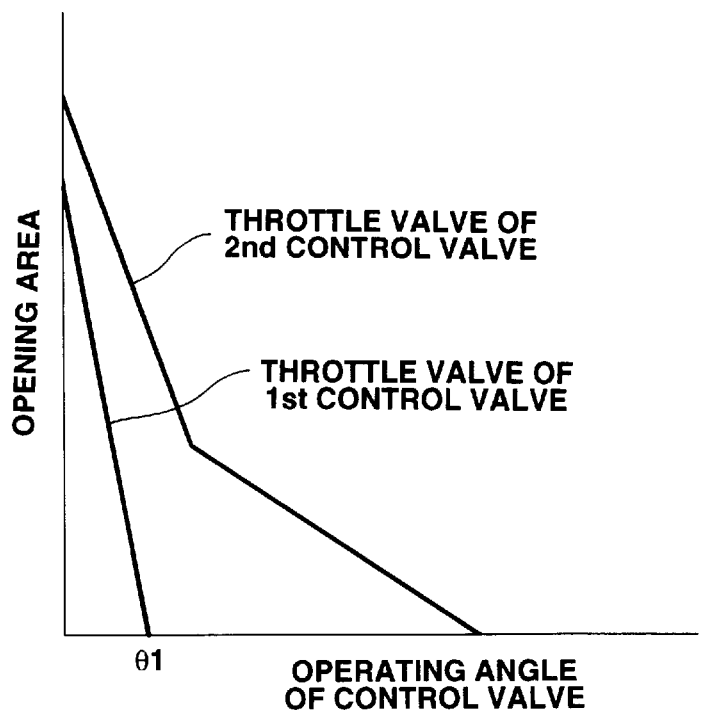
FIG. 16 is a graph which shows relationships between an operated angle and an opening area of the control valves of the third embodiment.

As shown in FIG. 11, the choke valves 106a, 106b, 106c and 106d of the first control valve 107 are constituted by two inner projections 136 and 136 and three outer projections 138, 138 and 138. The two inner projections 136 and 136 are formed at an outer periphery of a valve shaft 135 integrally rotatable with the steering shaft (not shown), and the three outer projections 138, 138 and 138 are formed at an inner periphery of a circular valve body 137. The circular valve body 137 is rotatably interconnected with the valve shaft 135 through a torsion bar (not shown) and interconnected to a wheel side. That is, the choke valves 106a, 106b, 106c and 106d are constituted by circumferential end portions of the inner projections 136 and circumferential end portions of the outer projections 138. Similarly, the choke valves 108a, 108b, 108c and 108d of the second control valve 109 are constituted by four inner projections 139, 139, 139 and 139 at an outer periphery of the valve shaft 135 and five outer projections 138, 138, 138, 138 and 138 formed at an inner periphery of the valve body 137. That is, the choke valves 108a, 108b, 108c and 108d are constituted by circumferential end portions of the inner projections 139 and circumferential end portions of the outer projections 138. The circumferential dimension of each inner projection 136 is formed greater than that of each inner projection 139 on the valve shaft 135. Therefore, when the valve shaft 135 is rotated with respect to the valve body 137, the choke valves 106a, 106d, 106b and 106c of the first control valve 107 are fully closed before the choke valves 108a, 108d, 108b and 108c of the second control valve 109 are fully closed, as shown in FIG. 16. Depressions 140 and 140 of the valve body 137 formed respectively between the choke valves 108a and 108c are the node 113 connecting the choke valves 108a and 108c. The node 113 is communicated with the hydraulic chamber 111 of the power cylinder 110. Depressions 141 of the valve body 137 formed between the choke valves 108b and 108d are the node 114 connecting the choke valves 108b and 108d. The node 114 is communicated with the hydraulic chamber 112 of the power cylinder 110. A central passage 142 of the valve shaft 135 is communicated with three depressions 143, 143 and 143 through three drain passages 105, 105 and 105, as shown in FIG. 11 and is communicated with an oil tank 144. Although the two power cylinders 110 and 110 are shown in FIG. 11, these power cylinders are the same one. FIG. 11 shows a condition that a steering wheel is put in a neutral state and the first and second control valves 107 and 109 are put in a neutral state.

Figure 12:
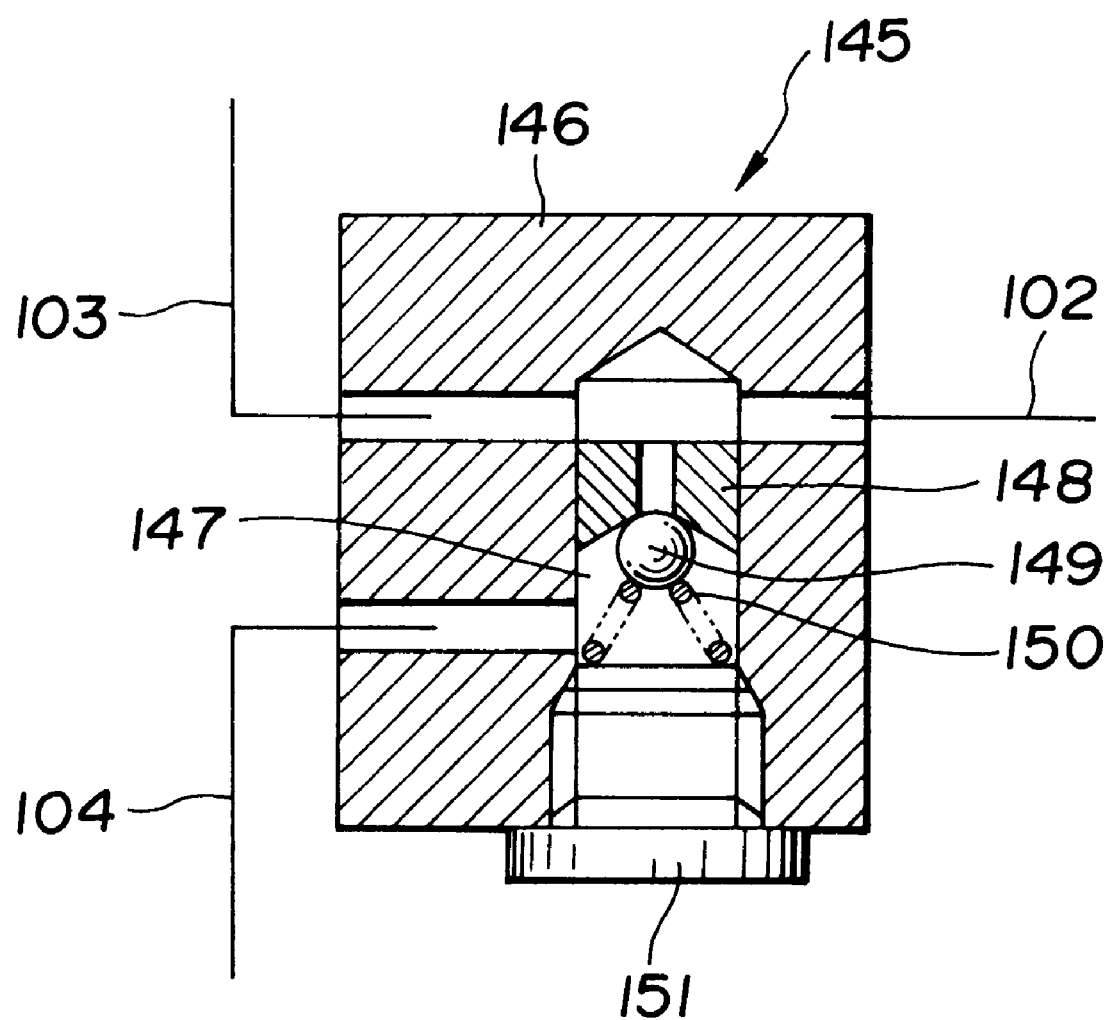
FIG. 12 is an explanatory view which shows a structure of a check valve applied to the second embodiment of FIG. 10.
Figure 13:
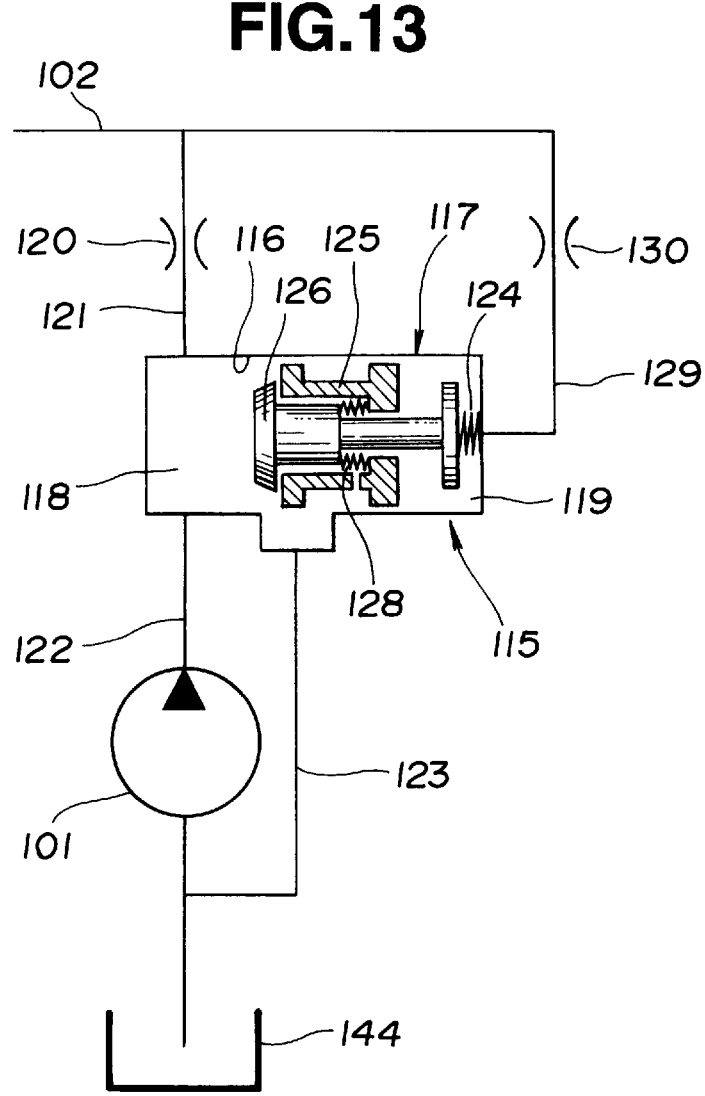
FIG. 13 is a partial view of the power assist apparatus of FIG. 10 which shows an operating condition of a flow rate control valve in a high load pressure.
Figure 14:
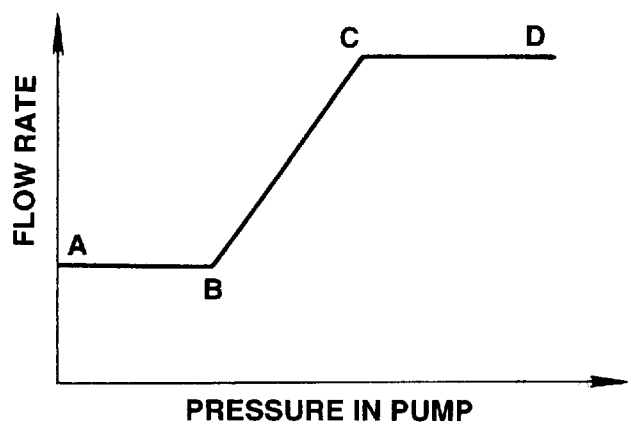
FIG. 14 is a graph which shows a characteristic curve of the flow rate control valve.

Disposed in the second branch passage 104 is a check valve 145 which functions as a flow resistance to allow that the hydraulic oil flows from the hydraulic pump 101 to the second control valve 109 and to forbid that the hydraulic oil from flowing from the second control valve 109 to the hydraulic pump 101. The structure of the check valve 145 is basically the same as that of the check valve 45 of the second embodiment. That is, as shown in FIG. 12, a valve housing 146 of the check valve 145 has a valve hole 147 to which the hydraulic pressure passage 102 and the first and second branch passages 103 and 104 are respectively communicated. A hollow plug 148 is installed in the valve hole 147 such that a ball valve 149 is biasingly disposed on a valve seat of the hollow plug 148 by means of a check spring 150. In order to set the pressure difference between the upstream and downstream of the check valve 145 at a predetermined value, a preferable spring is selected as the check spring 150. An open end of the valve hole 147 is fixedly and sealingly closed by a plug 151 functioning as a check spring pushing means.

Further, a bypass passage 152 is installed to connect the upstream side and the downstream side of the check valve 145 so as to bypass the check valve 145. In the bypass passage 152, a pressure responsive type bypass valve 153 is disposed to open the bypass passage 152 when the pressure applied to the bypass valve 153 becomes greater than a predetermined value.

Next, the manner of operation of the power assist apparatus of the second embodiment according to the present invention will be discussed.

The hydraulic pump 101 is rotated by a not-shown internal combustion engine. The hydraulic oil discharged from the hydraulic pump 101 is supplied to the first pressure chamber 118 of the flow rate control valve 115 through the guide passage 122. The hydraulic oil supplied to the first pressure chamber 118 is returned to the inlet side of the hydraulic pump 101 and the oil tank 144 only when the control orifice 120 limits the flow of the hydraulic oil and the drain passage is opened by the movement of the spool valve 117 by the pressure differences between the inlet side and the outlet side of the control orifice 120. That is, a necessary flow rate of the hydraulic oil under the limitation of the control orifice 120 is supplied from the discharging passage 121 to the hydraulic pressure passage 102 and the first and second branch passages 103 and 104.

The flow-rate control valve 115 is arranged such that the spool valve 117 is constituted by the outer spool 125 and the inner spool 126, the spring 128 biases the inner spool 126 toward the first pressure chamber 118 and the outer spool 125 toward the second pressure chamber 119, and the control spring 124 biases the inner spool 126 toward the first pressure chamber 118. Therefore, when the pressure in the first and second pressure chambers 118 and 119 is low, the outer spool 125 is biased toward the second pressure chamber 118 by the spring 128 and the spool valve 117 compresses the control spring 124 at a predetermined length to control the flow rate by means of the pressure difference by the control orifice 120 and the spring force of the control spring 124. When the pressure in the first and second pressure chambers 118 and 119 is high, the outer spool 125 is moved toward the first pressure chamber by the pressure in the second pressure chamber 118 against the biasing force of the spring 128 so as to be located at a predetermined position. By this movement of the outer spool 125, the positional relationship between the spool valve 117 and the drain passage 123 is changed. Therefore, the spool valve 117 further compresses the control spring 128. The spool valve 117 is moved while keeping the balance between the sum of the biasing force of the control spring 124 and the biasing force of the spring 128 and the pressure in the first and second pressure chambers 118 and 119 in order to control the flow rate.

When the pressure in the first pressure chamber 118 is low, that is, when the inner pressure of the hydraulic pump 101 is low, the outer spool 125 is biased toward the second pressure chamber 119 by the spring 128 and integrally functions with the inner spool 126. Therefore, the spool valve 117 is moved according to the biasing force of the control spring 124 and the pressure difference by the control orifice 120, and the flow rate passing through the control orifice 120 is represented by a line A–B in FIG. 14.

Next, if the pressure in the first pressure chamber 118 is raised up, the flow rate passing through the control orifice 120 is also increased and the pressure in the hydraulic pressure passage 102 is increased. Therefore, the pressure in the second pressure chamber 119 is increased since the pressure in the hydraulic pressure passage 102 is supplied to the second pressure chamber 119. When the pressure in the second pressure chamber 119 is increased to overcome the biasing force of the spring 128, the outer spool 125 is moved toward the first pressure chamber 118 until the biasing force of the spring 128 is balanced with the pressure in the second pressure chamber 119 to decrease the opening area of the drain passage 123. The decrease of the opening area of the drain passage 123 invites the increase of the pressure difference of the control orifice 120 and therefore the spool valve is moved toward the second pressure chamber 119 against the biasing force of the control spring 124 so as to keep the pressure difference of the control orifice 120 constant. Therefore, the flow rate control is executed by balancing the pressure difference of the control orifice 120 with the sum of the biasing force of the spring 128 and the biasing force of the control spring 124. Accordingly, the flow rate passing through the control orifice 120 becomes as shown by the line B–C of FIG. 14.

When the pressure in the first and second pressure chambers 118 and 119 reaches a predetermined pressure, the outer spool 125 is moved to the most biased position toward the first pressure chamber 118 thus putting the spring 228 in the most biased condition. In this condition, the spool valve 117 controls the flow rate in response to the control spring 124 and the pressure difference of the control orifice 120, such that the flow rate passing through the control orifice 120 is controlled as shown by the line C–D of FIG. 14. When The flow rate is the maximum value supplied to the hydraulic pressure passage 102 and the load pressure is high, that is, the first and second control valves 107 and 109 are put in the operating condition, the flow rate passing through the control orifice 120 is normally controlled at the flow rate shown by the line C–D of FIG. 14.

On the other hand, when the steering is put in the neutral position, that is, when the first and second control valves 107 and 109 are put in the neutral position, the hydraulic oil supplied to the first and second control valves 107 and 109 is returned through the center-open type choke valves 106a, 106b, 1106c and 106d of the first control valve 107 to the drain passage 105. This lowers the operation pressure of the hydraulic pressure passage 102 and lowers the pressure in the second pressure chamber 119. Since the choke valves 108a, 108b, 108c and 108d of the second control valve 109 are also of a center-open type, the hydraulic oil is also returned through the second control valve 109 though receiving the resistance of the orifice 131. Therefore, in order to keep the difference pressure by the control orifice 120 constant, the spool valve 117 is moved toward the second pressure chamber 119 against the biasing force of the control spring 124 to increase the opening area of the drain passage 123. Accordingly, most of the hydraulic oil supplied to the first pressure chamber 118 through the guide passage 122 is flowed into the drain passage 123 to decease the inner pressure (discharging pressure) of the hydraulic pump 101. This decreases the workload of the hydraulic pump 101. Simultaneously, non-operating condition of the first and second control valves 107 and 109 lowers the pressure in the hydraulic pressure passage 102 and the pressure in the second pressure chamber 119. Therefore, the outer spool 125 receiving the pressure of the second pressure chamber 119 is moved toward the second pressure chamber 119 by the biasing force of the spring 128. Therefore, in case that the spool valve 117 constituted by the inner and outer spools 125 and 126 is located at a position where the pressure difference by the control orifice 120, that is, the pressure in the first pressure chamber 118 and the sum of the pressure in the second pressure chamber 119 and the biasing force of the control spring 124 are balanced, the opening area of the drain passage 123 is further increased by the movement amount of the outer spool 125 toward the second pressure chamber 119.

In the non-operating condition, the hydraulic oil supplied to the first pressure chamber 118 is returned to the inlet side of the hydraulic pump 101 and the oil tank 144 through the drain passage 123 whose opening area has been increased. Therefore, the hydraulic pump 101 discharging the hydraulic oil through the guide passage 122 to the first pressure chamber 118 decreases its discharging pressure and more particularly decreases the workload thereof. This effectively improves the energy saving of the hydraulic pump 101.

Next, when the steering operation of the steering wheel is started from the neutral position, the relative rotation through the torsion bar is generated between the valve shaft 135 integrally movable with the steering shaft receiving the steering force from the steering wheel and the valve body 137 receiving the contact resistance of the steered wheels under the large contact resistance condition. In this condition, the choke valves 106a and 106d, or 106b and 106c of the first control valve 107 are fully closed, then the choke valves 108a and 108d, or 108b and 108c of the second control valve 109 are fully closed. That is, the first control valve 107 is operated before the second control valve 109 is operated. Therefore, by closing the first control valve 107, the hydraulic oil returned from the first branch passage 103 through the first control valve 107 to the drain passage 105 is flowed by the orifice 145 in the second branch passage 104 from the second branch passage 104 through the orifice 145 to the second control valve 109 when the steering is put in the neutral position.

Figure 17:
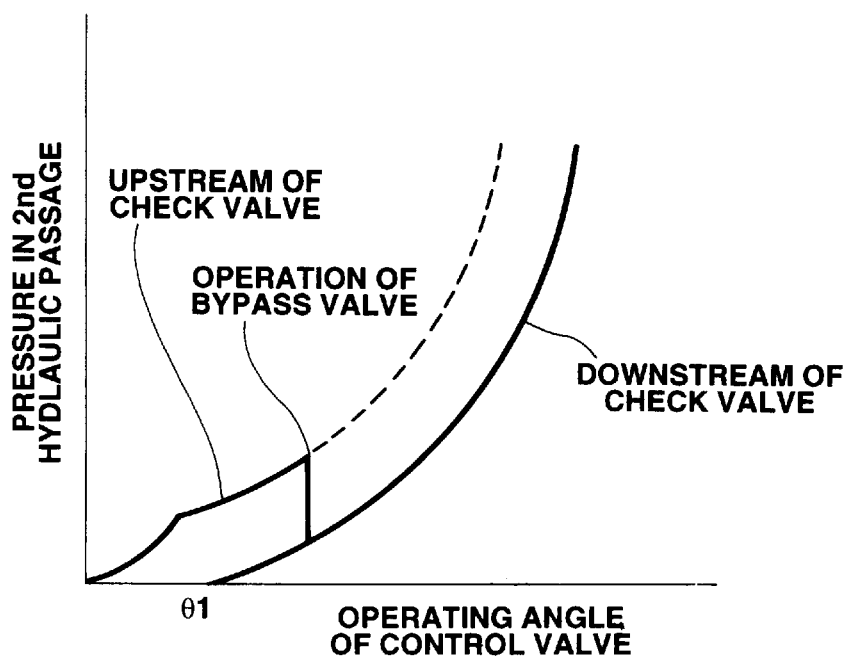
FIG. 17 is a graph which shows a relationship between the operated angle of the control valve and the pressure difference by the check valve set in a second branch passage.

By the flow of the hydraulic oil through the check valve 145 functioning as a flow resistance, the check valve 145 generates the pressure difference between the upstream side and the downstream side thereof, and the pressure at the upstream side of the orifice 131 is increased as shown in FIG. 17. Accordingly, the control valve 115 for controlling the flow rate according to the load pressure promptly increases the flow rate of the hydraulic oil supplied to the hydraulic pressure passage 102 and the second control valve 109.

Figure 15:
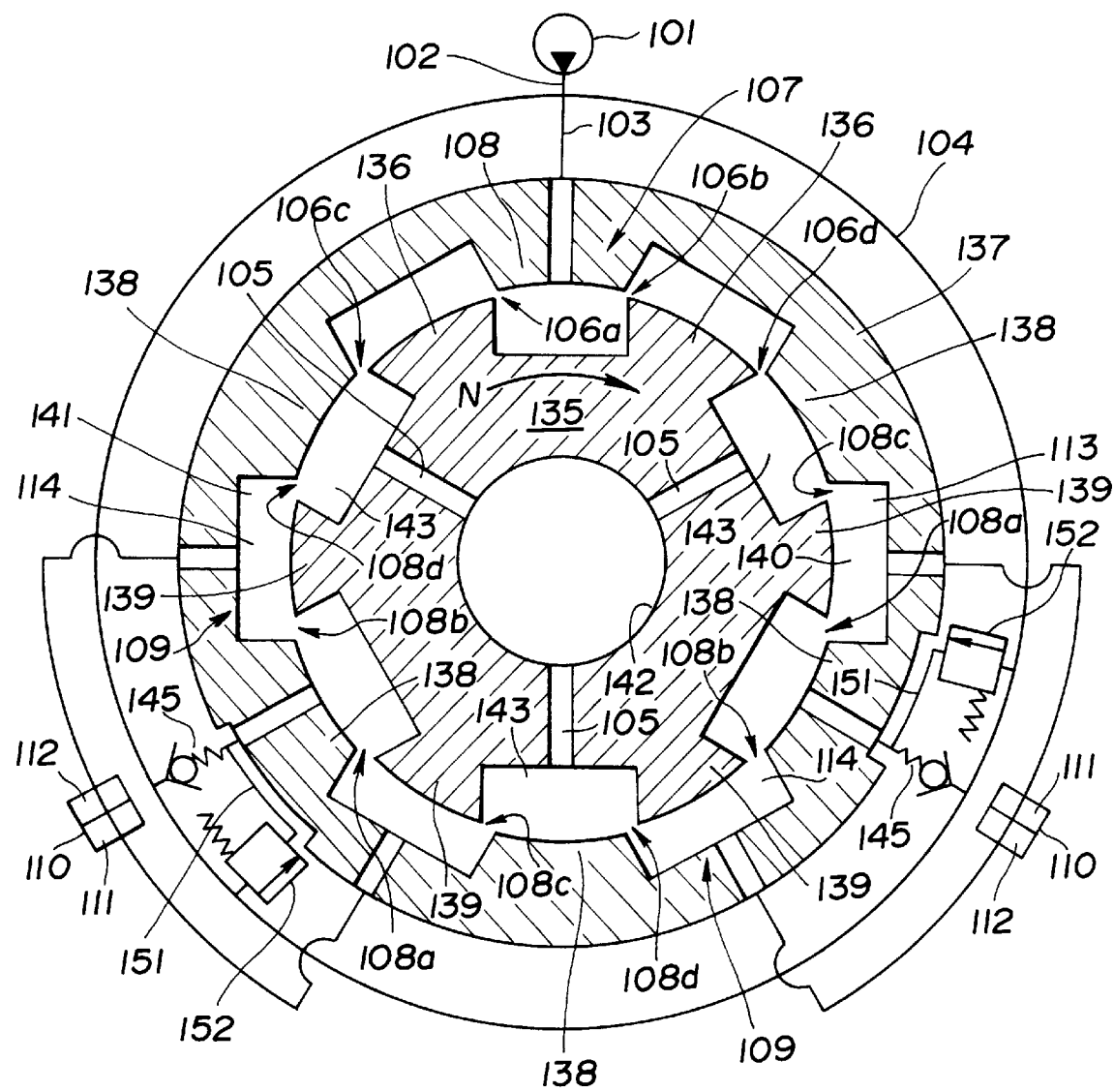
FIG. 15 is a view which shows a transition of the first and second control valves from a neutral condition to the operating condition of the third embodiment.

When the valve shaft 135 is rotated with respect to the valve body 137 in the clockwise direction shown by the arrow N in FIG. 15 from the neutral position shown in FIG. 11, the choke valves 106a and 106d of the first control valve 107 is first closed and simultaneously the choke valves 106b and 106c are opened, and therefore the flow through the first branch passage 103 to the drain passage 105 is closed. Then, the choke valves 108a and 108d of the second control valve 109 are closed, and the choke valves 108b and 108c are further opened. Accordingly, the hydraulic oil supplied through the check valve 145 is supplied to the hydraulic chamber 111 of the power cylinder 110 through the choke valve 108b, and the hydraulic oil in the hydraulic chamber 111 of the power cylinder 110 is discharged through the choke valve 108c to the drain passage 105. As a result, the power cylinder 110 is moved toward the predetermined direction to apply the steering assist power directing in the predetermined direction to the steering linkage.

On the other hand, when the steering wheel is steered in a direction reverse to the above condition such that the valve shaft 135 is rotated with respect to the valve body 137 in the anticlockwise direction, the choke valves 106b and 106c of the first control valve 107 is first closed and simultaneously the choke valves 106a and 106d is opened, and therefore the flow through the first branch passage 103 to the drain passage 105 is closed. Then, the choke valves 108b and 108c of the second control valve 109 are closed, and the choke valves 108a and 108d are further opened. Accordingly, the hydraulic oil supplied through the check valve 145 is supplied to the hydraulic chamber 111 of the power cylinder 110 through the choke valve 108a, and the hydraulic oil in the hydraulic chamber 112 of the power cylinder 110 is discharged through the choke valve 108d to the drain passage 105. As a result, the power cylinder 110 is moved toward the predetermined direction to apply the steering assist power directing in the predetermined direction to the steering linkage.

Therefore, even when the radical steering operation is executed, the flow-rate control valve 115 promptly increases the flow rate of the hydraulic oil. Since the increased amount of the hydraulic oil flows into the hydraulic chamber 111 or 112 of the power cylinder 110 through the choke valve 108a or 108b, the steering assist power is stably applied to the steering linkage without causing the shortage of the flow rate of the hydraulic oil.

The operating flow rate being increased by the flow control of the flow control valve 115, the pressure in the downstream side of the check valve 145 which is required to take a predetermined pressure value in order to ensure a large assist power at the power cylinder 110 reaching the predetermined pressure value, the bypass valve 153 is operated to open the bypass passage 152 so as not to further increase the pressure in the upstream side of the check valve 145. This enables the hydraulic oil upstream of the check valve 145 to be discharged through the bypass passage 152 to the drain passage 105. Accordingly, since this hydraulic oil passing through the bypass passage 152 does not pass through the check valve 145, the load for passing the hydraulic oil through the check valve 145 is canceled to decrease the workload of the hydraulic pump 101. Further, since it is not necessary to set the operable pressure difference by the check valve 145 at a relatively high value, the unnecessary rising of the temperature of the hydraulic oil and the degradation thereby are effectively suppressed.

Referring to FIGS. 18 to 24, there is shown a fourth embodiment of a power assist apparatus according to the present invention.

Figure 18:
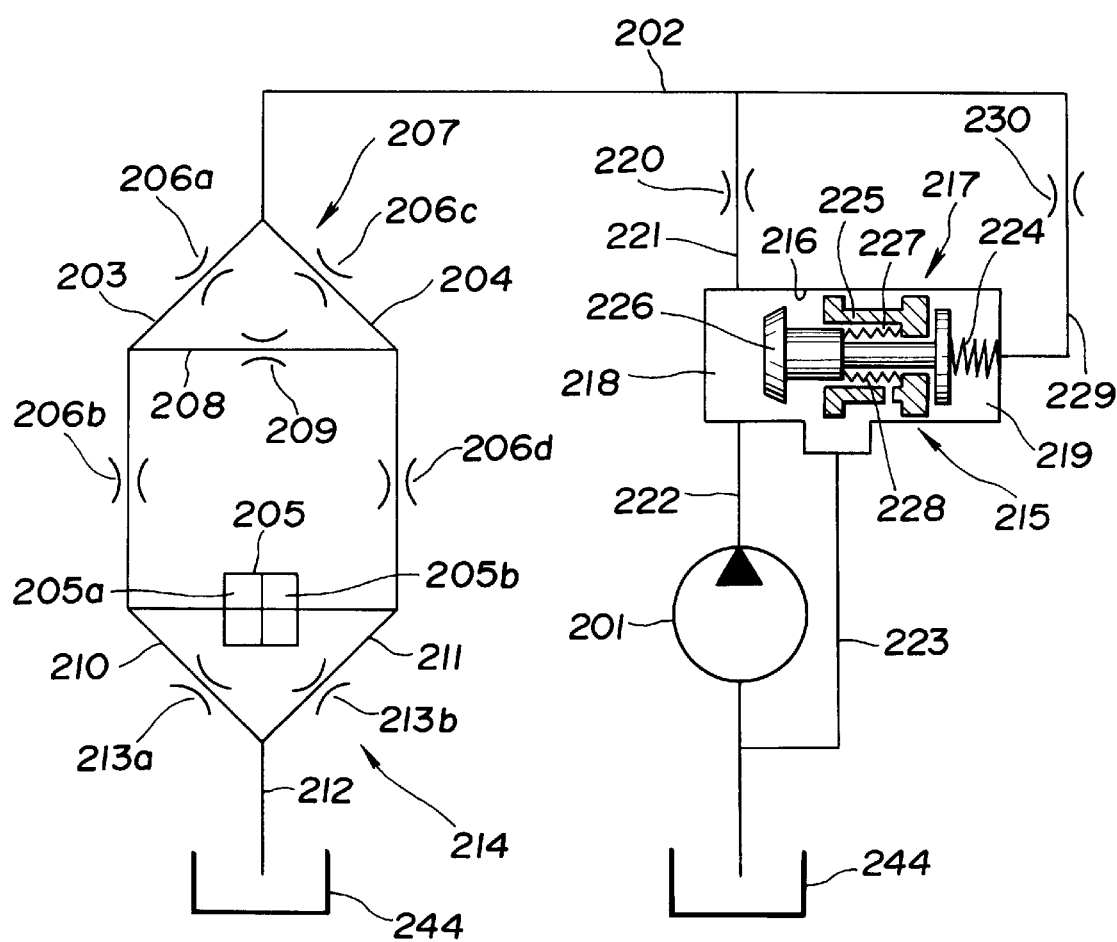
FIG. 18 is an explanatory view which shows a fourth embodiment of a power assist apparatus according to the present invention.

As shown in FIG. 18, a hydraulic pump 201 driven by an internal combustion engine (not shown) supplies hydraulic oil to a hydraulic pressure passage 202. The hydraulic pressure passage 202 is branched into a first branch passage 203 and a second branch passage 204. The first branch passage 203 is communicated with a first hydraulic chamber 205a of a power cylinder 205, and the second branch passage 204 is communicated with a second hydraulic chamber 205b. Choke valves 206a and 206b, which change their choke amounts according to the steering torque of a not-shown steering shaft, are disposed in he first branch passage 203 in series, and choke valves 206c and 206d, which change their choke amounts according to the steering torque of the not-shown steering shaft, are disposed in the second branch passage 204 in series. The choke valves 206a, 206b, 206c and 206d of a center-open type construct a four-side bridge type circuit and constitutes a first control valve 207.

A connecting passage 208 connects the first branch passage 203 between the choke valves 206a and 206b and the second branch passage 204 between the choke valves 206c and 206d. Disposed in the connecting passage 208 is an orifice 209 functioning as a flow resistance means for applying a flow resistance to the hydraulic oil flowing into the connecting passage 208. A first drain passage 210 connects the first hydraulic chamber 205a of the power cylinder 205 and a drain passage 212. A second drain passage 211 connects the second hydraulic chamber 205b of the power cylinder 205 and the drain passage 212. A choke valve 213a for changing its choke amount according to the steering torque of the steering shaft is disposed in the first drain passage 210. A choke valve 213b for changing its choke amount according to the steering torque of the steering shaft is disposed in the second drain passage 211. The choke valves 213a and 213b constitute a second control valve 214.

A flow rate control valve 215 is disposed in the hydraulic pressure passage 202 and controls the flow rate of the hydraulic oil supplied to the first and second control valves 207 and 214 according to the change of the load pressure. The flow rate control valve 215 is arranged such that a spool valve 217 is slidably disposed in a spool cylinder 126 and divides the spool cylinder 216 into a first pressure chamber 218 and a second pressure chamber 219. The first pressure chamber 218 is communicated with a drain passage 223, an inlet passage 222 connected to a discharge port of the hydraulic pump 201 and a discharging passage 221 connected to the hydraulic pressure passage 202 through a control orifice 220. The second pressure chamber 219 is communicated with a guide passage 229 which is connected to hydraulic pressure passage 202 through a pressure sensitive orifice 230. A control spring 224 disposed in the second pressure chamber 219 biases the spool valve 217 toward the first pressure chamber 218 so that the necessary flow rate of the hydraulic oil is supplied from the discharging passage 221 through the control orifice 220 to the hydraulic pressure passage 202 and the residual of the hydraulic oil is returned to the drain passage 223 which is opened and closed by moving the spool valve 217.

The spool valve 217 is constituted by an outer spool 225 which is formed in a cylinder having a holed bottom and an inner spool 226 which has a large portion inserted in a cylinder of the outer spool 225 and a small portion inserted into a bottom hole of the outer spool 225. The bottom portion of the outer spool 225 is disposed in the second pressure chamber 219. A low pressure chamber 227 is defined by an inner periphery of the cylinder of the outer spool 225, an outer periphery of the small portion of the inner spool 225, an end portion of the large portion of the outer spool 225 and an inner surface of the bottom of the outer spool 225. A spring 228 is disposed between the inner spool 226 and the outer spool 225 to bias the inner spool 226 toward the first pressure chamber 218 and the outer spool 225 toward the second pressure chamber 219.

Figure 19:
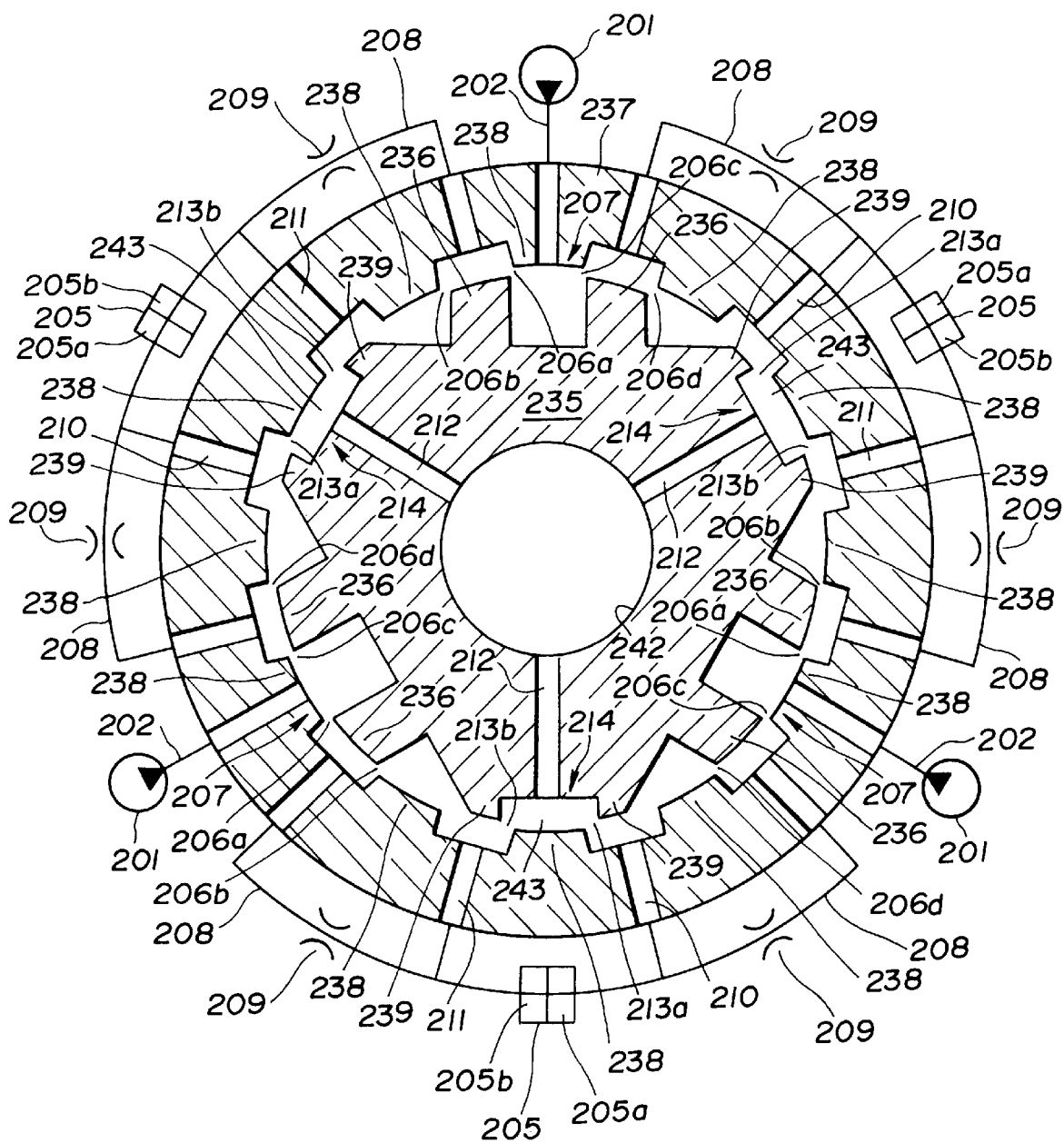
FIG. 19 is a view which shows a structure of first and second control valves of FIG. 18.
Figure 20:
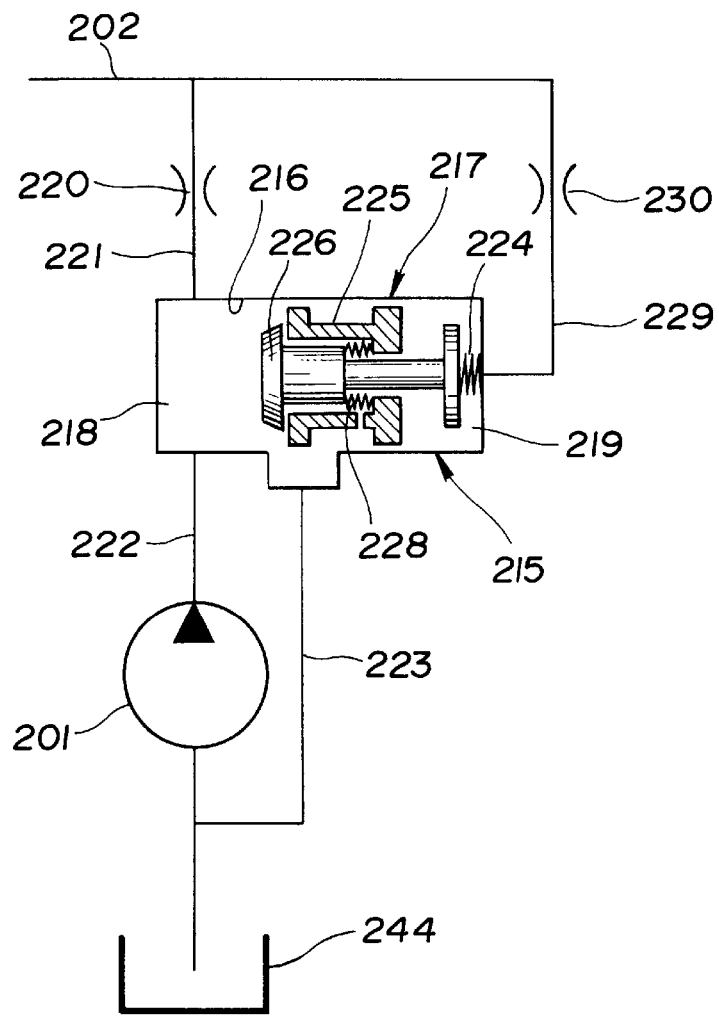
FIG. 20 is a partial view of the power assist apparatus of FIG. 18 which shows an operating condition of a flow rate control valve in a high load pressure.
Figure 21:
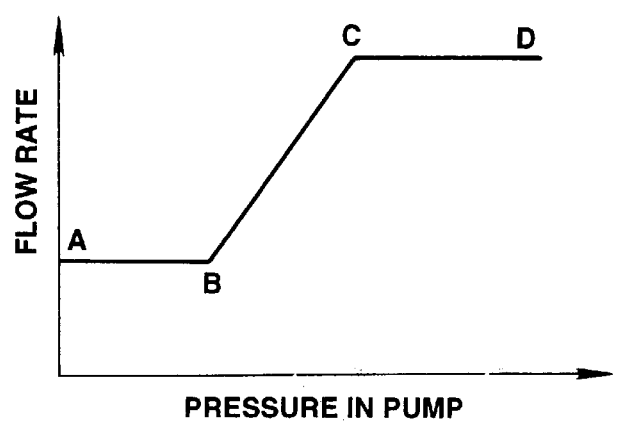
FIG. 21 is a graph which shows a characteristic curve of the flow rate control valve of FIG. 18.
Figure 23:
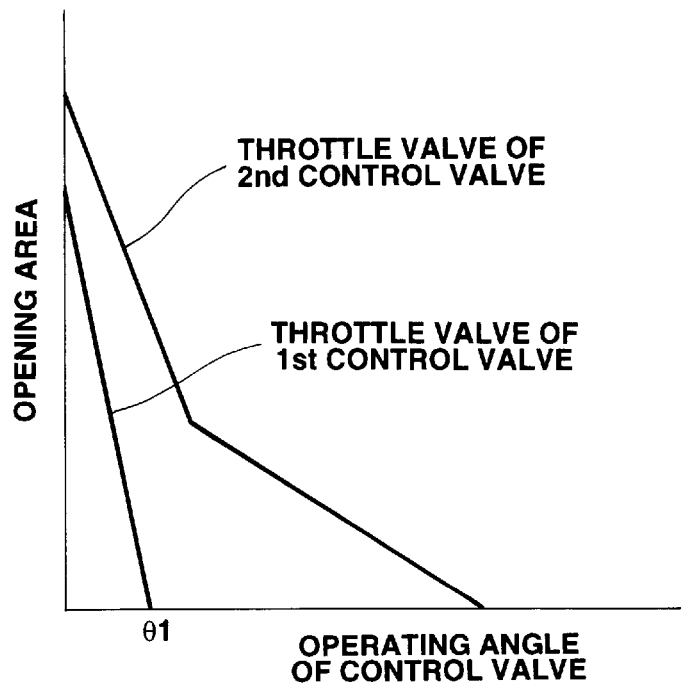
FIG. 23 is a graph which shows relationships between an operated angle and an opening area of the control valves of the third embodiment.

As shown in FIG. 19, the choke valves 206a, 206b, 206c and 206d of the first control valve 207 are constituted by inner projections 236 which are formed at an outer periphery of a valve shaft 235 integrally rotatable with the steering shaft (not shown) and outer projections 238 which are formed at an inner periphery of a circular valve body 237. The circular valve body 237 is rotatably interconnected with the valve shaft 235 through a torsion bar (not shown) and interconnected to a wheel side. That is, the choke valves 206a, 206b, 206c and 206d are constituted by circumferential end portions of the inner projections 236 and circumferential end portions of the outer projections 238. Similarly, the choke valves 213a and 213b of the second control valve 214 are constituted by inner projections 239 at an outer periphery of the valve shaft 235 and outer projections 238 formed at an inner periphery of the valve body 237. That is, the choke valves 213a and 213b are constituted by circumferential end portions of the inner projections 239 and circumferential end portions of the outer projections 238. The circumferential dimension of each inner projection 236 are formed greater than that of each inner projection 239 on the valve shaft 235. Therefore, when the valve shaft 235 is rotated with respect to the valve body 237, the choke valves 206a and 206d, or 206b and 206c of the first control valve 207 are fully closed before the choke valve 213a or 213b of the second control valve 214 are fully closed, as shown in FIG. 23. A central passage 242 of the valve shaft 235 is communicated with three depressions 243, 243 and 243 through three drain passages 212, 212 and 212, as shown in FIG. 19 and is communicated with an oil tank 244. Although the two power cylinders 210 and 210 are shown in FIG. 19, these power cylinders are the same one. FIG. 19 shows a condition that a steering wheel is put in a neutral state and the first and second control valves 207 and 214 are put in a neutral state.

Next, the manner of operation of the power assist apparatus of the fourth embodiment according to the present invention will be discussed.

The hydraulic pump 201 is rotated by a not-shown internal combustion engine. The hydraulic oil discharged from the hydraulic pump 201 is supplied to the first pressure chamber 218 of the flow-rate control valve 215 through the guide passage 222. The hydraulic oil supplied to the first pressure chamber 218 is returned to the inlet side of the hydraulic pump 201 and the oil tank 244 only when the control orifice 220 limits the flow of the hydraulic oil and the drain passage 223 is opened by the movement of the spool valve 217 by the pressure differences between the inlet side and the outlet side of the control orifice 220. That is, a necessary flow rate of the hydraulic oil under the limitation of the control orifice 220 is supplied from the discharging passage 221 to the hydraulic pressure passage 202 and the first and second branch passages 203 and 204.

The flow rate control valve 215 is arranged such that the spool valve 217 is constituted by the outer spool 225 and the inner spool 226, the spring 228 biases the inner spool 226 toward the first pressure chamber 218 and the outer spool 225 toward the second pressure chamber 219, and the control spring 224 biases the inner spool 226 toward the first pressure chamber 218. Therefore, when the pressure in the first and second pressure chambers 218 and 219 is low, the outer spool 225 is biased toward the second pressure chamber 218 by the spring 228 and the spool valve 217 compresses the control spring 224 at a predetermined length to control the flow rate by means of the pressure difference of the control orifice 220 and the spring force of the control spring 224. When the pressure in the first and second pressure chambers 218 and 219 is high, the outer spool 225 is moved toward the first pressure chamber by the pressure in the second pressure chamber 218 against the biasing force of the spring 228 so as to be located at a predetermined position. By this movement of the outer spool 225, the positional relationship between the spool valve 217 and the drain passage 223 is changed. Therefore, the spool valve 217 further compresses the control spring 228. The spool valve 217 is moved while keeping the balance between the sum of the biasing force of the control spring 224 and the biasing force of the spring 228 and the pressure in the first and second pressure chambers 218 and 219 to control the flow rate.

That is, when the pressure in the first pressure chamber 218 is low (when the inner pressure of the hydraulic pump 201 is low), the outer spool 225 is biased toward the second pressure chamber 219 by the spring 228 and integrally functions with the inner spool 226. Therefore, the spool valve 217 is moved according to the biasing force of the control spring 224 and the pressure difference by the control orifice 220, and the flow rate passing through the control orifice 220 is represented by a line A–B in FIG. 21.

Next, if the pressure in the first pressure chamber 218 is raised up, the flow rate passing through the control orifice 220 is also increased and the pressure in the hydraulic pressure passage 202 is increased. Therefore, the pressure in the second pressure chamber 19 is increased since the pressure in the hydraulic pressure passage 202 is supplied to the second pressure chamber 219. When the pressure in the second pressure chamber 219 is increased to overcome the biasing force of the spring 228, the outer spool 225 is moved toward the first pressure chamber 218 until the biasing force of the spring 228 is balanced with the pressure in the second pressure chamber 219 to decrease the opening area of the drain passage 223. The decrease of the opening area of the drain passage 223 invites the increase of the pressure difference of the control orifice 220 and therefore the spool valve 217 is moved toward the second pressure chamber 219 against the biasing force of the control spring 224 to keep the pressure difference of the control orifice 220 constant.

Therefore, the flow rate control is executed such that the pressure difference of the control orifice 220 is balanced with the sum of the biasing force of the spring 228 and the biasing force of the control spring 224. Accordingly, the flow rate passing through the control orifice 220 becomes as shown by the line B–C of FIG. 21.

When the pressure in the first and second pressure chambers 218 and 219 reaches a predetermined pressure, the outer spool 225 is moved to the most biased position toward the first pressure chamber 218 upon the spring 228 is put in the most biased condition. In this condition, the spool valve 217 controls the flow rate in response to the control spring 224 and the pressure difference of the control orifice 220, such that the flow rate passing through the control orifice 220 is controlled as shown by the line C–D of FIG. 21. This flow ate is the maximum value supplied to the hydraulic pressure passage 202. When the load pressure is high, hat is, when the first and second control valves 207 and 209 are put in the operating condition, the flow rate passing through the control orifice 220 is normally controlled at the flow rate shown by the line C–D of FIG. 21.

On the other hand, when the steering is put in the neutral position, that is, when the first and second control valves 207 and 214 are put in the neutral position, the hydraulic oil supplied to the first and second control valves 207 and 214 is returned through the center-open type choke valves 206a, 206b, 206c and 206d and the choke valves 213a and 213b to the drain passage 212. This lowers the operation pressure of the hydraulic pressure passage 202 and lowers the pressure in the second pressure chamber 219. Since the choke valves 213a and 213b of the second control valve 214 are also of a center-open type, the hydraulic oil is also returned through the second control valve 214 in spite of the orifice 231. Therefore, in order to keep the difference pressure of the control orifice 220 constant, the spool valve 217 is moved toward the second pressure chamber 219 against the biasing force of the control spring 224 to increase the opening area of the drain passage 223. Accordingly, most of the hydraulic oil supplied to the first pressure chamber 218 through the guide passage 222 is flowed into the drain passage 223 to decease the inner pressure (discharging pressure) of the hydraulic pump 201. This decreases the workload of the hydraulic pump 201. Simultaneously, non-operating condition of the first and second control valves 207 and 214 lowers the pressure in the hydraulic pressure passage 202 and the pressure in the second pressure chamber 219. Therefore, the outer spool 225 receiving the pressure of the second pressure chamber 219 is moved toward the second pressure chamber 219 by the biasing force of the spring 228. Therefore, in case that the spool valve 217 constituted by the inner and outer spools 225 and 226 is located at a position where the pressure difference of the control orifice 220, that is, the pressure in the first pressure chamber 218 and the sum of the pressure in the second pressure chamber 219 and the biasing force of the control spring 224 are balanced, the opening area of the drain passage 223 is further increased by the movement amount of the outer spool 225 toward the second pressure chamber 219.

In the non-operating condition, the hydraulic oil supplied to the first pressure chamber 218 is returned to the inlet side of the hydraulic pump 201 and the oil tank 244 through the drain passage 223 whose opening area has been increased. Therefore, the hydraulic pump 201 discharging the hydraulic oil through the guide passage 222 to the first pressure chamber 218 decreases its discharging pressure, more particularly, decreases the workload thereof. This effectively improves the energy saving of the hydraulic pump 201.

Next, when the steering operation of the steering wheel is started from the neutral position, the relative rotation through the torsion bar is generated between the valve shaft 235 integrally movable with the steering shaft receiving the steering force from the steering wheel and the valve body 237 receiving the contact resistance of the steered wheels under the large contact resistance condition. In this condition, the choke valves 206a and 206d, or 206b and 206c of the first control valve 207 are fully closed, then the choke valve 213a or 213b of the second control valve 214 is fully closed. That is, one of the choke valves 206a and 206b disposed in the first branch passage 203 is closed and the other one of them is opened, and similarly one of the choke valves 206c and 206d is opened and the other one of them is closed. More particularly, one of the choke valves 6a and 6c disposed at a hydraulic pressure passage 202 side of the choke valves 206a, 206b, 206c and 206d disposed in the first and second branch passages 203 and 204 is closed and the other of them is opened, and one of the choke valves 206b and 206d disposed at the power cylinder 205 side is closed and the other one of then is opened. Further, one of the choke valves 213a and 213b of the second control valve 214 is closed and the other one of them is opened. That is, the first control valve 207 is operated before the second control valve 214 is operated. Accordingly, Therefore, when the steering is put in the neutral position, the by closing the first control valve 207, the hydraulic oil returned to the drain passage 212 through the first and second control valves 207 and 214 flows through the opened choke valve of the choke valves 206a and 206c disposed at the hydraulic pressure passage 202 side of one of the first and second branch passage 202 and 203, such as the choke valve 206a of the second branch passage 204 and flows into the power cylinder 205 and the second control valve 214.

Figure 24:
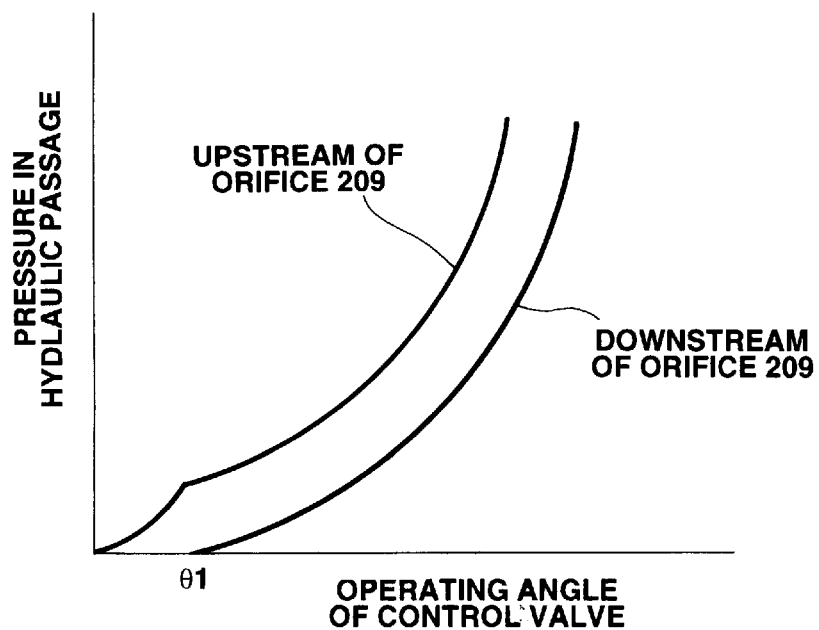
FIG. 24 is a graph which shows a relationship between the operated angle of the control valve and the pressure difference by the orifice set in the second branch passage.

By the flow of the hydraulic oil through the orifice 209 functioning as a flow resistance, the orifice 209 generates the pressure difference between the upstream side and the downstream side thereof, and the pressure at the upstream side of the orifice 209 is increased as shown in FIG. 24. Accordingly, the control valve 215 for controlling the flow rate according to the load pressure promptly increases the flow rate of the hydraulic oil supplied to the hydraulic pressure passage 202 and the first control valve 207.

Figure 22:
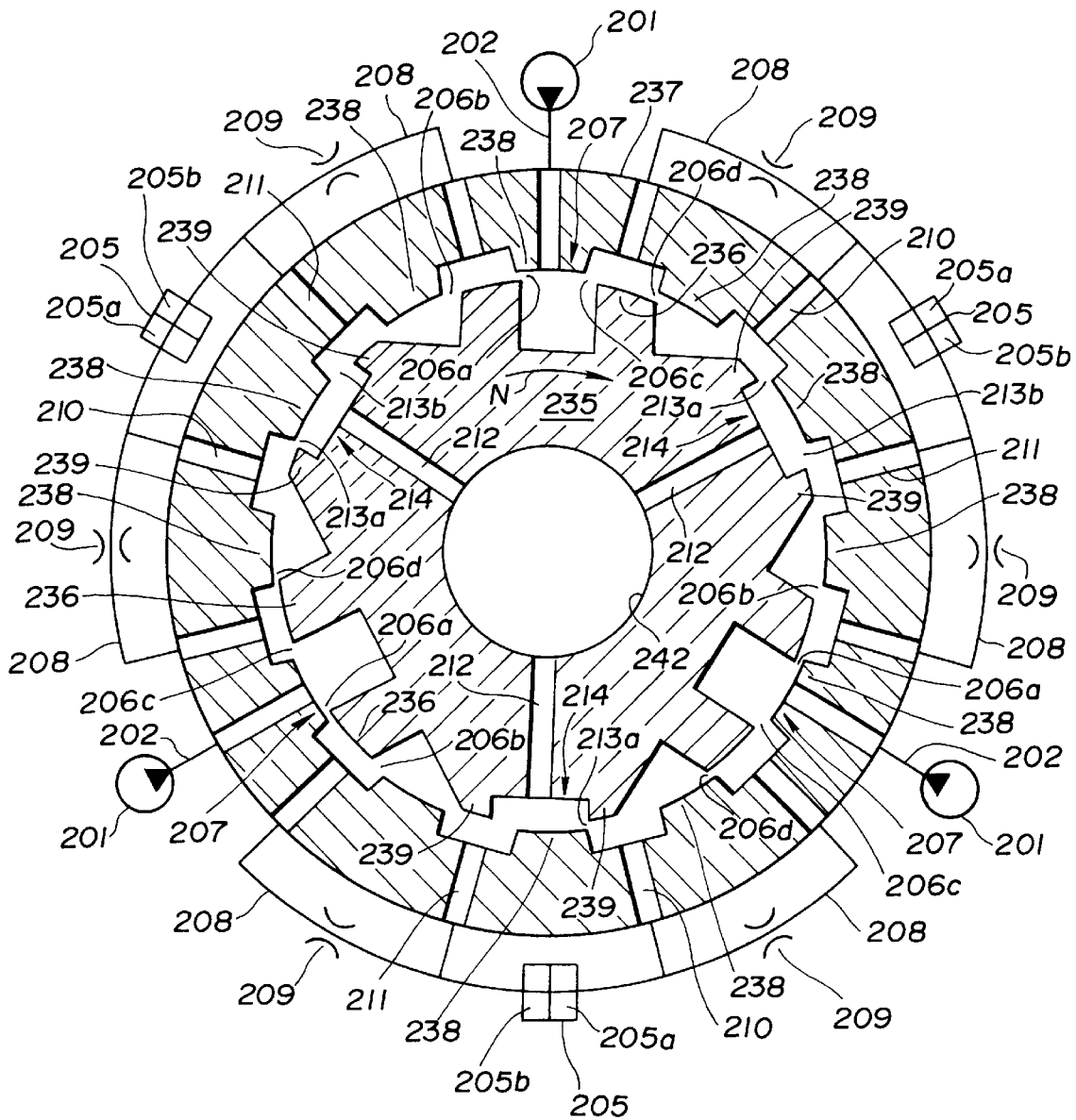
FIG. 22 is a view which shows a transition of the first and second control valves from a neutral condition to the operating condition of the fourth embodiment.

When the valve shaft 235 is rotated with respect to the valve body 237 in the clockwise direction shown by the arrow N in FIG. 22 from the neutral position shown in FIG. 19, the choke valves 206b and 206c of the first control valve 207 increase their openings and the choke valves 206a and 206d are closed. The choke valve 213a of the second control valve 214 starts closing and the choke valve 213b increases its opening. Accordingly, the hydraulic oil supplied through the hydraulic pressure passage 202 is supplied to the hydraulic chamber 205a of the power cylinder 205, and the hydraulic oil in the hydraulic chamber 205b of the power cylinder 205 is discharged through the choke valve 213b to the drain passage 212. As a result, the power cylinder 205 is moved toward the predetermined direction to apply the steering assist power directing in the predetermined direction to the steering linkage.

On the other hand, when the steering wheel is steered in a direction reverse to the above condition such that the valve shaft 235 is rotated with respect to the valve body 237 in the anticlockwise direction, the choke valves 206b and 206c of the first control valve 207 is first closed and simultaneously the choke valves 206a and 206d are opened. Therefore, the flow through the choke valve 206b to the drain passage 212 is closed. Then, the choke valve 213a is further opened, and the choke valve 213b starts closing. Accordingly, the hydraulic oil supplied from the hydraulic pressure passage 202 is supplied to the hydraulic chamber 205b of the power cylinder 206 through the choke valve 206a and the orifice 209, and the hydraulic oil in the hydraulic chamber 205a of the power cylinder 205 is discharged through the choke valve 213a to the drain passage 5. As a result, the power cylinder 205 is moved toward the predetermined direction to apply the steering assist power directing in the predetermined direction to the steering linkage.

Therefore, even when the radical steering operation is executed, the flow rate control valve 215 promptly increased the flow rate of the hydraulic oil. Since the increased amount of the hydraulic oil is flowed into the hydraulic chamber 205a or 205b of the power cylinder 205 through the choke valves 206a and 206d or 206b and 206c, the steering assist power is stably applied to the steering linkage without causing the shortage of the flow rate of the hydraulic oil.

Figure 25:
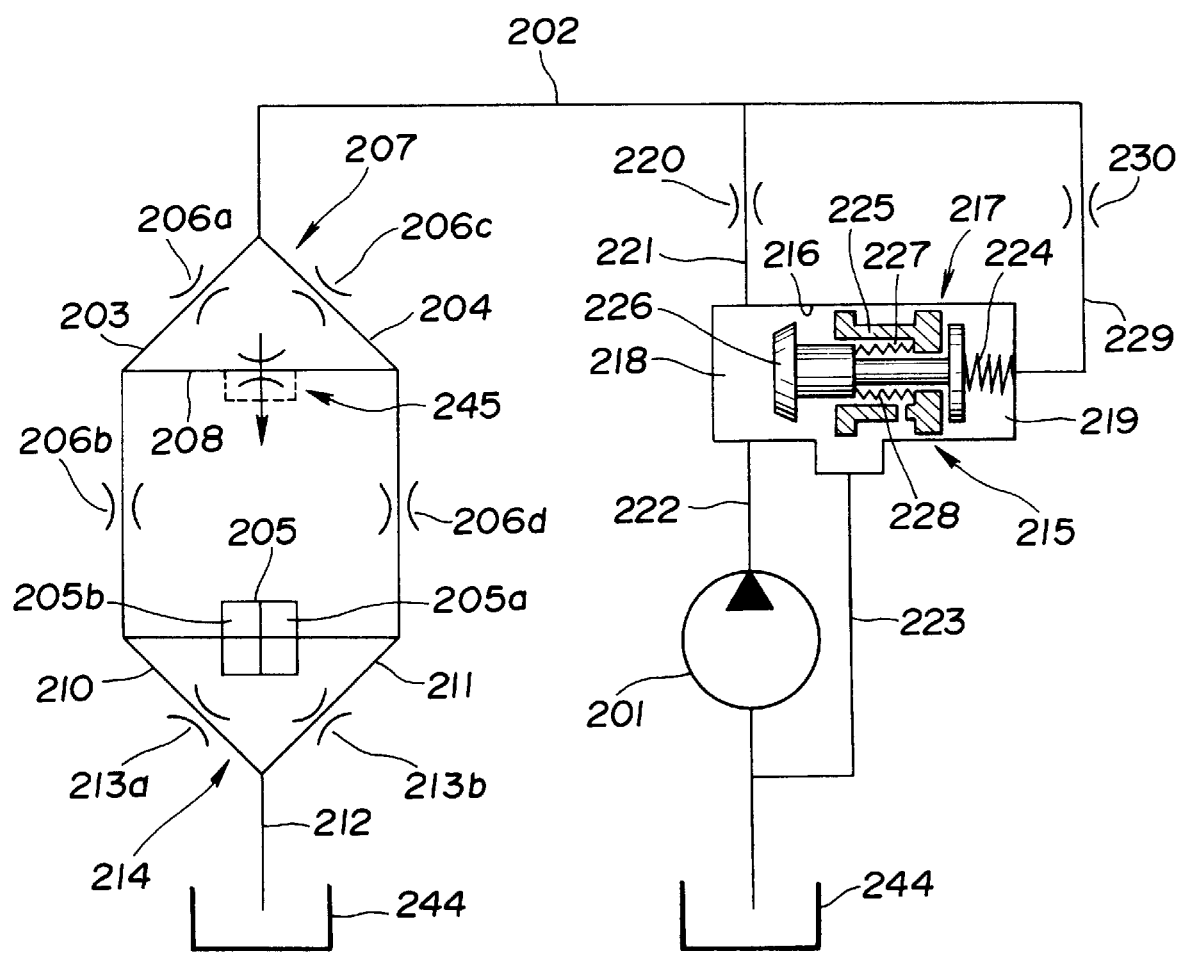
FIG. 25 is an explanatory view which shows a fifth embodiment of the power assist apparatus according to the present invention.
Figure 26:
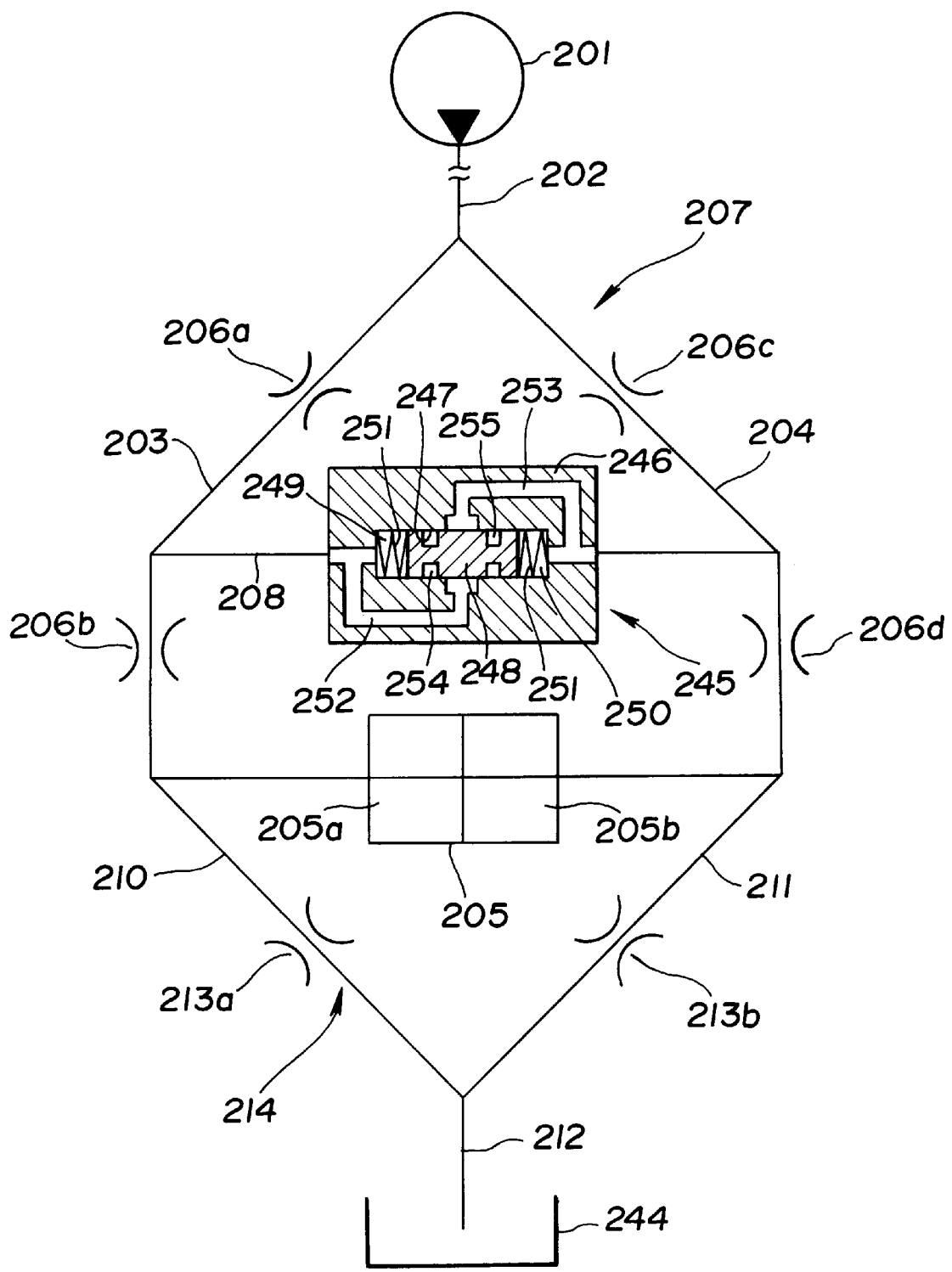
FIG. 26 is a partial view of the power assist apparatus of FIG. 18 which shows a structure of a check valve of the fifth embodiment.
Figure 27:
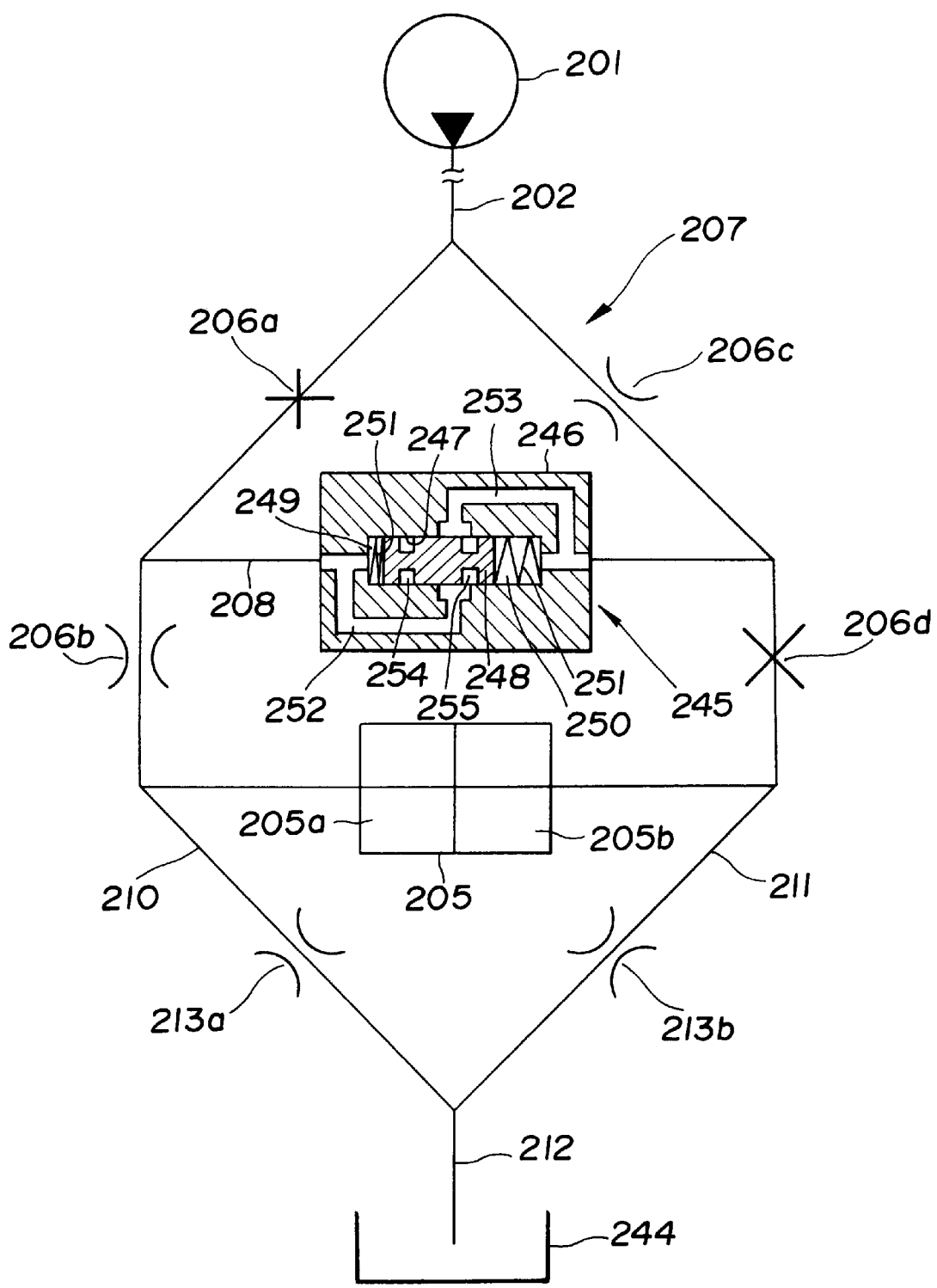
FIG. 27 is a view which shows an operating condition of the check valve of FIG. 26.

Referring to FIGS. 25 to 27, there is shown a fifth embodiment of the power assist apparatus according to the present invention. The fifth embodiment is the same as the fourth embodiment except that a check valve 245 which functions in the bidirectional flow, is disposed in the connecting passage 208 instead of the orifice 209.

As shown in FIG. 26, the check valve 245 is provided with a valve housing 246 in which a valve hole 247 is formed such that the connecting passage 208 penetrates the valve housing 246 in the axial direction. A spool valve 248 is slidably installed in the valve hole 246 so as to divide the valve hole 246 into a first vale chamber 249 and a second valve chamber 250. The spool valve 248 has a pair of grooves 254 and 255 at its both end portion, as shown in FIG. 26. A pair of check springs 251 and 251 are disposed in the first and second valve chambers 249 and 250, respectively so as to bias the spool valve 248. By properly selecting the spring 251, the operation pressure difference of the check valve 245 is et at a desired value. A bypass passage 252 is formed in the valve housing 246 so as to communicate a generally center portion of the valve hole 247 with an end portions of the connecting passage 208 upon bypassing the first valve chamber 249, and a bypass passage 253 is formed in the valve housing 246 so as to communicate the generally center portion of the valve hole 247 with another end portions of the connecting passage 208 upon bypassing the second valve chamber 250. When the spool valve 248 is placed at a generally center portion, the bypass passages 249 and 250 are closed by a body portion of the spool valve 248 to cut the communication thereby. The same parts and elements are designated by the same numerals of the fourth embodiment, and the explanation thereof will be omitted herein.

With the arrangement of the fifth embodiment, when the choke valves 206b and 206c are largely opened and the choke valves 206a and 206d are closed, the hydraulic oil supplied from the hydraulic pressure passage 202 is supplied from the choke valve 206c to the check valve 245. The hydraulic oil supplied from the connecting passage 208 to the second valve chamber 250 of the check valve 245 is increased in pressure. This pressure moves the spool valve 248 toward the first valve chamber 249 against the biasing force of the spring 251 as shown in FIG. 27. By the movement of the spool valve 248, the bypass passages 252 and 253 are opened through the groove 255. Therefore, the hydraulic oil supplied from the hydraulic pressure passage 202 is supplied to the hydraulic chamber 205a of the power cylinder 205 through the choke valve 206c and the check valve 245, and the hydraulic oil in the hydraulic chamber 205b of the power cylinder 205 is discharged to the drain passage 212. As a result, the power cylinder 205 is operated in the predetermined direction to apply a predetermined directional assist power to the steering linkage. In case that the steering is steered in the reverse direction against the above mentioned case, the pressure in the hydraulic chamber 205b of the power cylinder 205 is increased such that the assist power directing the reverse direction of the above mentioned case is applied to the steering linkage.

Therefore, in addition to ensuring the effective advantages gained by the fourth embodiment, the fifth embodiment functions to suppress the rising of the pressure of the hydraulic oil in the hydraulic pressure passage 202 by the function of the check valve 245 as a pressure control valve in addition to the flow resistance in the connecting passage 208. That is, since the pressure difference by the flow of the hydraulic oil through the check valve is preferably set at a predetermined value by the selection the check springs 251, it is not necessary to increase the set pressure difference of the check valve 245. This effectively suppresses the rising of the temperature of the hydraulic oil and the degradation caused thereby.

It will be understood that the present invention is not limited by the above-mentioned embodiment and may be modified without departing the form the spring and scope thereof. For example, the connecting passage of the fourth and fifth embodiments may be constructed by two parallel passages which have one-way check valves, respectively.

Although the first, second and third embodiments of the power assist apparatus according to the present invention have been shown and described such that the fixed-choke type orifice 31 or check valve 45, 145 is disposed in the second branch passage 4, 104, it will be understood that a variable orifice may be disposed in the second branch passage 4, 104. Further, a center-close type valve may be used instead of the choke valve of the second control valve disposed at the second branch passage 4, 104 side.

With the above-explained embodiments of the present invention, it becomes possible to possibly decrease the workload of the hydraulic pump when the steering is put in the neutral position, and further even when the steering is radically steered, the stable assist power is supplied to the steering linkage without generating the shortage of the flow rate of the hydraulic oil.

What is claimed is:

1. A power assist apparatus for applying assist power to a steering system, said power assist apparatus comprising:

a hydraulic pump supplying hydraulic oil;

a hydraulic pressure passage connected to a discharge side of said hydraulic pump;

first and second passages branching from said hydraulic pressure passage;

a drain passage in fluid communication with an inlet side of said hydraulic pump;

a first control valve disposed between said first branch passage and said drain passage, said first control valve including four choke valves constructed into a four-side bridge circuit, each choke valve changing its choke amount according to the steering torque of a steering shaft of the steering system;

a second control valve disposed between said second branch passage and said drain passage, said second control valve including first, second, third, and fourth choke valves which change their choke amounts according to the steering torque of the steering shaft, the first and second choke valves of said second control valve being disposed closer to said second branch passage and the third and fourth choke valves of said second control valve being disposed closer to said drain passage;

a power cylinder through which assist power is applied to the steering system, said power cylinder having first and second hydraulic chambers which are connected to a first connecting point between said first and third choke valves of said second control valve and a second connecting point between said second and fourth choke valves of said second control valve;

a flow rate control valve disposed in said hydraulic pressure passage, said flow rate control valve controlling the flow rate of the hydraulic oil to be supplied to said first and second flow control valves according to a load pressure of said hydraulic pump, said flow rate control valve increasing a flow rate of hydraulic oil according to an increase of a load pressure of said hydraulic pump; and a flow resister disposed in said second passage;

wherein said first and fourth choke valves of said second control valve accomplish their opening control operations after at least one of the chokes valves of said first control valve is closed.

2. A power assist apparatus as claimed in claim 1, wherein said flow resister includes an orifice.

3. A power assist apparatus as claimed in claim 1, wherein each choke valve of said first control valve is a center open valve, and each of the first, second, third, and fourth choke valves of said second control valve is one of a center open valve and a center close valve.

4. A power assist apparatus as claimed in claim 1, wherein the four choke valves of said first control valve are arranged into a four-side bridge circuit, and the first, second, third, and fourth choke valves of said second control valve are arranged into a four-side bridge circuit.

5. A power assist apparatus as claimed in claim 1, wherein each of said choke valves of said first control valve is a center open valve.

6. A power assist apparatus as claimed in claim 5, wherein said first and second choke valves of said second control valve are center open valves.

7. A power assist apparatus as claimed in claim 6, wherein said first and second choke valves of said second control valve are closed after at least one of said choke valves of said first control valve is closed.

8. A power assist apparatus for applying assist power to a steering system, said power assist apparatus comprising:

a hydraulic pump discharging hydraulic oil;

a hydraulic pressure passage connected with a discharging side of said hydraulic pump;

a flow rate control valve disposed in said hydraulic pressure passage, said flow rate control valve controlling the flow rate of the hydraulic oil flowing through said hydraulic pressure passage according to the hydraulic pressure of said hydraulic pump;

first and second branch passages branched from said hydraulic pressure passage;

a power cylinder through which assist power is applied to a steering system, said power cylinder having first and second hydraulic chambers;

a first control valve disposed downstream of said first branch passage, said first control valve including first, second, third and fourth choke valves which change their choke amounts according to the steering torque of a steering shaft of the steering system, the first and second choke valves being arranged in parallel and connected to said first branch passage, the third choke valve being connected to the first choke valve and a drain passage, the fourth valve being connected to the second choke valve and said drain passage;

a second control valve disposed downstream of said second branch passage, said second control valve including first, second, third and fourth choke valves which change their choke amounts according to the steering torque of the steering shaft, the first and second choke valves being arranged in parallel and connected to said second branch passage, the third choke valve being connected to the first choke valve and said drain passage, the fourth valve being connected to the second choke valve and said drain passage, a first point connecting the first and third choke valves being connected to the first hydraulic chamber of said power cylinder, a second point connecting the second and fourth choke valves being connected to the second hydraulic chamber of said power cylinder, the first and fourth choke valves of said second control valve being closed after at least one of the choke valves of said first control valve is closed; and a flow resister disposed in said second branch passage, said flow resister imparting a predetermined pressure to said hydraulic pump and said flow rate control valve when a steer angle of the steering system is put in a neutral position and said first control valve is in a full open state.

9. A power assist apparatus as claimed in claim 8, further comprising a bypass passage which is installed such that the hydraulic oil bypasses said flow resistance means.

10. A power assist apparatus as claimed in claim 8, wherein said flow resistance means includes a check valve which allows that the hydraulic oil flows from said hydraulic pump to said second control valve and forbids that the hydraulic flows from said second control valve to said hydraulic pump.

* * * * *